United States Patent
Livingood (10) Patent No.: US 10,517,140 B2
(45) Date of Patent: Dec. 24, 2019

(54) DETERMINING A LOCATION OF A DEVICE FOR CALLING VIA AN ACCESS POINT

(71) Applicant: Comcast Cable Communications, LLC, Philadelphia, PA (US)

(72) Inventor: Jason D. Livingood, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/052,201

(22) Filed: Aug. 1, 2018

(65) Prior Publication Data

US 2019/0132904 A1    May 2, 2019

Related U.S. Application Data (63) Continuation of application No. 15/589,797, filed on May 8, 2017, now Pat. No. 10,070,466, which is a continuation of application No. 14/732,229, filed on Jun. 5, 2015, now Pat. No. 9,648,644, which is a continuation of application No. 14/641,203, filed on (Continued)

(51) Int. Cl.

| | |
|---|---|
| H04W 76/50 | (2018.01) |
| H04W 4/90 | (2018.01) |
| H04L 12/24 | (2006.01) |
| H04M 7/00 | (2006.01) |
| H04M 3/42 | (2006.01) |
| H04W 64/00 | (2009.01) |
| H04L 29/06 | (2006.01) |

(Continued)

(52) U.S. Cl.
CPC ............ *H04W 76/50* (2018.02); *H04L 41/12* (2013.01); *H04L 65/1069* (2013.01); *H04M 1/72536* (2013.01); *H04M 3/42* (2013.01); *H04M 7/006* (2013.01); *H04W 4/021* (2013.01); *H04W 4/90* (2018.02); *H04W 64/00* (2013.01); *H04W 64/003* (2013.01); *H04L 41/22* (2013.01); *H04M 2242/04* (2013.01)

(58) Field of Classification Search
CPC ..... H04L 41/12; H04L 41/22; H04L 65/1059; H04M 1/72536; H04M 3/42; H04M 7/006; H04M 2242/04; H04W 4/021; H04W 4/30; H04W 64/00; H04W 64/003; H04W 76/50
USPC ......... 370/352, 389, 395.2, 401; 379/37, 45, 379/221.01, 88.12; 455/404.1, 456.1; 709/220, 205; 701/410

See application file for complete search history.

(56) References Cited

U.S. PATENT DOCUMENTS

| | | |
|---|---|---|
| 4,456,925 A | 6/1984 | Skerlos et al. |
| 4,620,289 A | 10/1986 | Chauvel |

(Continued)

FOREIGN PATENT DOCUMENTS

| | | |
|---|---|---|
| AU | 199859680 | 9/1998 |
| CN | 1909726 A | 2/2007 |

(Continued)

OTHER PUBLICATIONS

Bodamer, Charging in Multi-Service Networks, University of Stuttgart, 16 pages, Nov. 12, 1998.

(Continued)

*Primary Examiner* — Gerald Gauthier
(74) *Attorney, Agent, or Firm* — Banner & Witcoff, Ltd.

(57) ABSTRACT

Methods and systems are described for voice over packet communications.

36 Claims, 1 Drawing Sheet

Related U.S. Application Data

Mar. 6, 2015, now Pat. No. 9,055,550, which is a continuation of application No. 14/224,785, filed on Mar. 25, 2014, now Pat. No. 9,036,626, which is a continuation of application No. 13/012,959, filed on Jan. 25, 2011, now Pat. No. 8,724,522, which is a continuation of application No. 10/924,485, filed on Aug. 24, 2004, now Pat. No. 7,940,746.

(51) Int. Cl.
*H04M 1/725* (2006.01)
*H04W 4/021* (2018.01)

(56) References Cited

U.S. PATENT DOCUMENTS

| | | |
|---|---|---|
| 4,725,694 A | 2/1988 | Auer et al. |
| 4,878,048 A | 10/1989 | Gottesman et al. |
| 4,916,441 A | 4/1990 | Gombrich |
| 4,922,529 A | 5/1990 | Kiel |
| 4,995,074 A | 2/1991 | Goldman et al. |
| 5,014,197 A | 5/1991 | Wolf |
| 5,014,267 A | 5/1991 | Tompkins et al. |
| 5,101,501 A | 3/1992 | Gilhousen et al. |
| 5,109,528 A | 4/1992 | Uddenfeldt |
| 5,157,717 A | 10/1992 | Hitchcock |
| 5,187,710 A | 2/1993 | Chau et al. |
| 5,226,045 A | 7/1993 | Chuang |
| 5,235,632 A | 8/1993 | Raith |
| 5,253,341 A | 10/1993 | Rozmanith et al. |
| 5,260,944 A | 11/1993 | Tomabechi |
| 5,260,988 A | 11/1993 | Schellinger et al. |
| 5,267,261 A | 11/1993 | Blakeney, II et al. |
| 5,274,700 A | 12/1993 | Gechter et al. |
| 5,276,731 A | 1/1994 | Arbel et al. |
| 5,301,050 A | 4/1994 | Czerwiec et al. |
| 5,327,578 A | 7/1994 | Breeden et al. |
| 5,333,175 A | 7/1994 | Ariyavisitakul et al. |
| 5,335,276 A | 8/1994 | Thompson et al. |
| 5,341,425 A | 8/1994 | Wasilewski et al. |
| 5,349,638 A | 9/1994 | Pitroda et al. |
| 5,363,431 A | 11/1994 | Schull et al. |
| 5,367,558 A | 11/1994 | Gillig et al. |
| 5,375,161 A | 12/1994 | Fuller et al. |
| 5,390,233 A | 2/1995 | Jensen et al. |
| 5,392,331 A | 2/1995 | Patsiokas et al. |
| 5,393,964 A | 2/1995 | Hamilton et al. |
| 5,406,557 A | 4/1995 | Baudoin |
| 5,406,564 A | 4/1995 | Okita |
| 5,406,615 A | 4/1995 | Miller, II et al. |
| 5,428,601 A | 6/1995 | Owen |
| 5,428,608 A | 6/1995 | Freeman et al. |
| 5,442,680 A | 8/1995 | Schellinger et al. |
| 5,448,619 A | 9/1995 | Evans et al. |
| 5,449,970 A | 9/1995 | Kumar et al. |
| 5,475,677 A | 12/1995 | Arnold et al. |
| 5,479,411 A | 12/1995 | Klein |
| 5,483,588 A | 1/1996 | Eaton et al. |
| 5,488,412 A | 1/1996 | Majeti et al. |
| 5,488,649 A | 1/1996 | Schellinger |
| 5,507,035 A | 4/1996 | Bantz et al. |
| 5,509,052 A | 4/1996 | Chia et al. |
| 5,512,935 A | 4/1996 | Majeti et al. |
| 5,515,420 A | 5/1996 | Urasaka et al. |
| 5,533,027 A | 7/1996 | Akerberg et al. |
| 5,533,110 A | 7/1996 | Pinard et al. |
| 5,534,913 A | 7/1996 | Majeti et al. |
| 5,537,157 A | 7/1996 | Washino et al. |
| 5,546,316 A | 8/1996 | Buckley et al. |
| 5,546,447 A | 8/1996 | Skarbo et al. |
| 5,559,800 A | 9/1996 | Mousseau et al. |
| 5,561,604 A | 10/1996 | Buckley et al. |
| 5,572,005 A | 11/1996 | Hamilton et al. |
| 5,583,965 A | 12/1996 | Douma et al. |
| 5,584,054 A | 12/1996 | Tyneski et al. |
| 5,587,735 A | 12/1996 | Ishida et al. |
| 5,592,529 A | 1/1997 | Linsker |
| 5,594,782 A | 1/1997 | Zicker et al. |
| 5,610,910 A | 3/1997 | Focsaneanu et al. |
| 5,610,969 A | 3/1997 | McHenry et al. |
| 5,612,997 A | 3/1997 | Vallelonga, Sr. et al. |
| 5,615,252 A | 3/1997 | Sizer, II et al. |
| 5,619,684 A | 4/1997 | Goodwin et al. |
| 5,628,005 A | 5/1997 | Hurvig |
| 5,629,978 A | 5/1997 | Blumhardt et al. |
| 5,634,193 A | 5/1997 | Ghisler |
| 5,640,414 A | 6/1997 | Blakeney, II et al. |
| 5,642,348 A | 6/1997 | Barzegar et al. |
| 5,644,628 A | 7/1997 | Schwarzer et al. |
| 5,652,789 A | 7/1997 | Miner et al. |
| 5,659,598 A | 8/1997 | Byrne et al. |
| 5,659,878 A | 8/1997 | Uchida et al. |
| 5,664,005 A | 9/1997 | Emery et al. |
| 5,671,267 A | 9/1997 | August et al. |
| 5,673,307 A | 9/1997 | Holland et al. |
| 5,675,629 A | 10/1997 | Raffel et al. |
| 5,682,195 A | 10/1997 | Hendricks et al. |
| 5,684,918 A | 11/1997 | Abecassis |
| 5,689,501 A | 11/1997 | Takase et al. |
| 5,689,553 A | 11/1997 | Ahuja et al. |
| 5,689,555 A | 11/1997 | Sonnenberg |
| 5,696,815 A | 12/1997 | Smyk |
| 5,706,342 A | 1/1998 | Baeder et al. |
| 5,708,961 A | 1/1998 | Hylton et al. |
| 5,712,907 A | 1/1998 | Wegner et al. |
| 5,724,355 A | 3/1998 | Bruno et al. |
| 5,724,411 A | 3/1998 | Eisdorfer et al. |
| 5,724,412 A | 3/1998 | Srinivasan |
| 5,724,658 A | 3/1998 | Hasan |
| 5,732,076 A | 3/1998 | Ketseoglou et al. |
| 5,737,333 A | 4/1998 | Civanlar et al. |
| 5,740,230 A | 4/1998 | Vaudreuil |
| 5,740,231 A | 4/1998 | Cohn et al. |
| 5,742,596 A | 4/1998 | Baratz et al. |
| 5,742,905 A | 4/1998 | Pepe et al. |
| 5,745,556 A | 4/1998 | Ronen |
| 5,745,852 A | 4/1998 | Khan et al. |
| 5,751,706 A | 5/1998 | Land et al. |
| 5,751,760 A | 5/1998 | Fuller et al. |
| 5,754,775 A | 5/1998 | Adamson et al. |
| 5,758,281 A | 5/1998 | Emery et al. |
| 5,764,752 A | 6/1998 | Waite et al. |
| 5,768,513 A | 6/1998 | Kuthyar et al. |
| 5,778,173 A | 7/1998 | Apte |
| 5,784,444 A | 7/1998 | Snyder et al. |
| 5,790,806 A | 8/1998 | Koperda |
| 5,793,413 A | 8/1998 | Hylton et al. |
| 5,796,394 A | 8/1998 | Wicks et al. |
| 5,796,424 A | 8/1998 | Ely et al. |
| 5,796,718 A | 8/1998 | Caterisano |
| 5,796,727 A | 8/1998 | Harrison et al. |
| 5,796,729 A | 8/1998 | Greaney et al. |
| 5,796,952 A | 8/1998 | Davis et al. |
| 5,802,045 A | 9/1998 | Kos et al. |
| 5,802,160 A | 9/1998 | Kugell et al. |
| 5,802,510 A | 9/1998 | Jones |
| 5,805,587 A | 9/1998 | Norris et al. |
| 5,809,128 A | 9/1998 | McMullin |
| 5,812,511 A | 9/1998 | Kawamura et al. |
| 5,812,522 A | 9/1998 | Lee et al. |
| 5,812,786 A | 9/1998 | Seazholtz et al. |
| 5,815,525 A | 9/1998 | Smith et al. |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,825,829 A | 10/1998 | Borazjani et al. |
| 5,825,862 A | 10/1998 | Voit et al. |
| 5,832,221 A | 11/1998 | Jones |
| 5,835,720 A | 11/1998 | Nelson et al. |
| 5,850,340 A | 12/1998 | York |
| 5,850,429 A | 12/1998 | Joyce et al. |
| 5,852,767 A | 12/1998 | Sugita |
| 5,859,895 A | 1/1999 | Pomp et al. |

(56) References Cited

U.S. PATENT DOCUMENTS

| | | | |
|---|---|---|---|
| 5,859,902 | A | 1/1999 | Freedman |
| 5,862,345 | A | 1/1999 | Okanoue et al. |
| 5,867,495 | A | 2/1999 | Elliott et al. |
| 5,870,565 | A | 2/1999 | Glitho |
| 5,870,677 | A | 2/1999 | Takahashi et al. |
| 5,883,677 | A | 3/1999 | Hofmann |
| 5,883,942 | A | 3/1999 | Lim et al. |
| 5,887,020 | A | 3/1999 | Smith et al. |
| 5,887,259 | A | 3/1999 | Zicker et al. |
| 5,887,260 | A | 3/1999 | Nakata |
| 5,890,055 | A | 3/1999 | Chu et al. |
| 5,890,064 | A | 3/1999 | Widergen et al. |
| 5,894,504 | A | 4/1999 | Alfred et al. |
| 5,896,444 | A | 4/1999 | Perlman et al. |
| 5,898,668 | A | 4/1999 | Shaffer |
| 5,898,780 | A | 4/1999 | Liu et al. |
| 5,903,834 | A | 5/1999 | Wallstedt et al. |
| 5,907,547 | A | 5/1999 | Foladare et al. |
| 5,907,598 | A | 5/1999 | Mandalia et al. |
| 5,907,604 | A | 5/1999 | Hsu |
| 5,912,952 | A | 6/1999 | Brendzel |
| 5,912,962 | A | 6/1999 | Bosco |
| 5,915,224 | A | 6/1999 | Jonsson |
| 5,916,302 | A | 6/1999 | Dunn et al. |
| 5,917,624 | A | 6/1999 | Wagner |
| 5,920,705 | A | 7/1999 | Lyon et al. |
| 5,923,731 | A | 7/1999 | McClure |
| 5,926,760 | A | 7/1999 | Khan et al. |
| 5,928,335 | A | 7/1999 | Morita |
| 5,930,340 | A | 7/1999 | Bell |
| 5,936,949 | A | 8/1999 | Pasternak et al. |
| 5,940,512 | A | 8/1999 | Tomoike |
| 5,944,795 | A | 8/1999 | Civanlar |
| 5,946,381 | A | 8/1999 | Danne et al. |
| 5,946,386 | A | 8/1999 | Rogers et al. |
| 5,946,622 | A | 8/1999 | Bojeryd |
| 5,949,773 | A | 9/1999 | Bhalla et al. |
| 5,956,717 | A | 9/1999 | Kraay et al. |
| 5,960,341 | A | 9/1999 | LeBlanc et al. |
| 5,960,361 | A | 9/1999 | Chen |
| 5,960,364 | A | 9/1999 | Dent |
| 5,970,072 | A | 10/1999 | Gammenthaler, Jr. et al. |
| 5,970,473 | A | 10/1999 | Gerszberg et al. |
| 5,978,470 | A | 11/1999 | Shaffer et al. |
| 5,982,774 | A | 11/1999 | Foladare et al. |
| 5,982,784 | A | 11/1999 | Bell |
| 5,987,010 | A | 11/1999 | Schnizlein |
| 5,987,100 | A | 11/1999 | Fortman et al. |
| 5,987,508 | A | 11/1999 | Agraharam et al. |
| 5,991,380 | A | 11/1999 | Bruno et al. |
| 5,995,500 | A | 11/1999 | Ma et al. |
| 5,995,606 | A | 11/1999 | Civanlar et al. |
| 5,995,828 | A | 11/1999 | Nishida |
| 5,999,525 | A | 12/1999 | Krishnaswamy et al. |
| 5,999,598 | A | 12/1999 | Henrick et al. |
| 5,999,602 | A | 12/1999 | Yang et al. |
| 5,999,612 | A | 12/1999 | Dunn et al. |
| 6,005,861 | A | 12/1999 | Humpleman |
| 6,005,873 | A | 12/1999 | Amit |
| 6,006,253 | A | 12/1999 | Kumar et al. |
| 6,009,410 | A | 12/1999 | LeMole et al. |
| 6,011,909 | A | 1/2000 | Newlin et al. |
| 6,014,427 | A | 1/2000 | Hanson et al. |
| 6,016,318 | A | 1/2000 | Tomoike |
| 6,016,336 | A | 1/2000 | Hanson |
| 6,020,915 | A | 2/2000 | Bruno et al. |
| 6,021,136 | A | 2/2000 | Bharucha et al. |
| 6,023,724 | A | 2/2000 | Bhatia et al. |
| 6,026,441 | A | 2/2000 | Ronen |
| 6,028,848 | A | 2/2000 | Bhatia et al. |
| 6,028,867 | A | 2/2000 | Rawson et al. |
| 6,031,896 | A | 2/2000 | Gardell et al. |
| 6,031,899 | A | 2/2000 | Wu |
| 6,031,906 | A | 2/2000 | Rao |
| 6,035,193 | A | 3/2000 | Buhrmann et al. |
| 6,038,233 | A | 3/2000 | Hamamoto et al. |
| 6,044,403 | A | 3/2000 | Gerszberg et al. |
| 6,047,063 | A | 4/2000 | Perry |
| 6,049,594 | A | 4/2000 | Furman et al. |
| 6,052,444 | A | 4/2000 | Ferry et al. |
| 6,052,592 | A | 4/2000 | Schellinger et al. |
| 6,052,594 | A | 4/2000 | Chuang et al. |
| 6,052,725 | A | 4/2000 | McCann et al. |
| 6,061,434 | A | 5/2000 | Corbett |
| 6,069,879 | A | 5/2000 | Chatter |
| 6,075,796 | A | 6/2000 | Katseff et al. |
| 6,078,886 | A | 6/2000 | Dragosh et al. |
| 6,084,292 | A | 7/2000 | Shinohara |
| 6,085,231 | A | 7/2000 | Agraharam et al. |
| 6,088,368 | A | 7/2000 | Rubinstain et al. |
| 6,101,176 | A | 8/2000 | Honkasalo et al. |
| 6,101,246 | A | 8/2000 | Heinmiller et al. |
| 6,104,704 | A | 8/2000 | Buhler et al. |
| 6,104,800 | A | 8/2000 | Benson |
| 6,108,330 | A | 8/2000 | Bhatia et al. |
| 6,112,080 | A | 8/2000 | Anderson et al. |
| 6,112,088 | A | 8/2000 | Haartsen |
| 6,115,393 | A | 9/2000 | Engel et al. |
| 6,115,608 | A | 9/2000 | Duran et al. |
| 6,118,432 | A | 9/2000 | Kotorov et al. |
| 6,118,768 | A | 9/2000 | Bhatia et al. |
| 6,118,778 | A | 9/2000 | Amin |
| 6,118,784 | A | 9/2000 | Yokota et al. |
| 6,119,000 | A | 9/2000 | Stephenson et al. |
| 6,122,357 | A | 9/2000 | Farris et al. |
| 6,125,376 | A | 9/2000 | Klarlund et al. |
| 6,128,304 | A | 10/2000 | Gardell et al. |
| 6,130,886 | A | 10/2000 | Ketseoglou et al. |
| 6,131,119 | A | 10/2000 | Fukui |
| 6,134,227 | A | 10/2000 | Magana |
| 6,134,235 | A | 10/2000 | Goldman et al. |
| 6,137,870 | A | 10/2000 | Scherer |
| 6,138,019 | A | 10/2000 | Trompower et al. |
| 6,138,100 | A | 10/2000 | Dutton et al. |
| 6,144,401 | A | 11/2000 | Casement et al. |
| 6,144,667 | A | 11/2000 | Doshi et al. |
| 6,148,067 | A | 11/2000 | Leipow |
| 6,154,531 | A | 11/2000 | Clapper |
| 6,160,880 | A | 12/2000 | Allen |
| 6,163,531 | A | 12/2000 | Kumar |
| 6,167,043 | A | 12/2000 | Frantz |
| 6,167,279 | A | 12/2000 | Chang et al. |
| 6,173,250 | B1 | 1/2001 | Jong |
| 6,175,619 | B1 | 1/2001 | DeSimone |
| 6,185,288 | B1 | 2/2001 | Wong |
| 6,188,756 | B1 | 2/2001 | Mashinsky |
| 6,192,116 | B1 | 2/2001 | Mayak |
| 6,198,941 | B1 | 3/2001 | Aho et al. |
| 6,201,797 | B1 | 3/2001 | Leuca et al. |
| 6,226,515 | B1 | 5/2001 | Pauli et al. |
| 6,229,792 | B1 | 5/2001 | Anderson et al. |
| 6,229,810 | B1 | 5/2001 | Gerszberg et al. |
| 6,229,887 | B1 | 5/2001 | Albers et al. |
| 6,233,235 | B1 | 5/2001 | Burke et al. |
| 6,233,313 | B1 | 5/2001 | Farris et al. |
| 6,236,852 | B1 | 5/2001 | Veerasamy et al. |
| 6,243,388 | B1 | 6/2001 | Mussman et al. |
| 6,243,445 | B1 | 6/2001 | Begeja et al. |
| 6,243,581 | B1 | 6/2001 | Jawanda |
| 6,246,489 | B1 | 6/2001 | Park |
| 6,252,952 | B1 | 6/2001 | Kung et al. |
| 6,256,511 | B1 | 7/2001 | Brown et al. |
| 6,262,979 | B1 | 7/2001 | Anderson et al. |
| 6,263,065 | B1 | 7/2001 | Durinovic-Johri et al. |
| 6,263,211 | B1 | 7/2001 | Brunner et al. |
| 6,263,503 | B1 | 7/2001 | Margulis |
| 6,266,340 | B1 | 7/2001 | Pickett et al. |
| 6,266,405 | B1 | 7/2001 | Madour et al. |
| 6,269,086 | B1 | 7/2001 | Magana et al. |
| 6,285,750 | B1 | 9/2001 | Brachman et al. |
| 6,289,025 | B1 | 9/2001 | Pang et al. |
| 6,292,553 | B1 | 9/2001 | Fellingham et al. |
| 6,292,671 | B1 | 9/2001 | Mansour |
| 6,295,298 | B1 | 9/2001 | Hrastar et al. |

(56) References Cited

U.S. PATENT DOCUMENTS

| | | | |
|---|---|---|---|
| 6,298,120 B1 | 10/2001 | Civanlar et al. |
| 6,300,947 B1 | 10/2001 | Kanevsky |
| 6,304,566 B1 | 10/2001 | Schessel |
| 6,304,573 B1 | 10/2001 | Hicks, III |
| 6,304,636 B1 | 10/2001 | Goldberg et al. |
| 6,310,889 B1 | 10/2001 | Parsons et al. |
| 6,317,684 B1 | 11/2001 | Roeseler et al. |
| 6,317,884 B1 | 11/2001 | Eames et al. |
| 6,320,673 B1 | 11/2001 | Motosugi |
| 6,320,873 B1 | 11/2001 | Nevo et al. |
| 6,324,279 B1 | 11/2001 | Kalmanek, Jr. et al. |
| 6,327,346 B1 | 12/2001 | Infosino |
| 6,327,470 B1 | 12/2001 | Ostling |
| 6,332,139 B1 | 12/2001 | Kaneko et al. |
| 6,333,931 B1 | 12/2001 | LaPier et al. |
| 6,339,594 B1 | 1/2002 | Civanlar et al. |
| 6,343,074 B1 | 1/2002 | Pickett |
| 6,343,115 B1 | 1/2002 | Foladare et al. |
| 6,347,075 B1 | 2/2002 | Barzegar et al. |
| 6,351,464 B1 | 2/2002 | Galvin et al. |
| 6,353,611 B1 | 3/2002 | Norris et al. |
| 6,356,546 B1 | 3/2002 | Beshai |
| 6,359,872 B1 | 3/2002 | Mahany et al. |
| 6,359,881 B1 | 3/2002 | Gerszberg et al. |
| 6,359,892 B1 * | 3/2002 | Szlam | H04M 3/42229 370/401 |
| 6,363,411 B1 | 3/2002 | Dugan et al. |
| 6,366,578 B1 | 4/2002 | Johnson |
| 6,373,817 B1 | 4/2002 | Kung et al. |
| 6,374,102 B1 | 4/2002 | Brachman et al. |
| 6,374,124 B1 | 4/2002 | Slabinski |
| 6,381,457 B1 | 4/2002 | Carlsson et al. |
| 6,385,202 B1 | 5/2002 | Katseff et al. |
| 6,385,646 B1 | 5/2002 | Brown et al. |
| 6,389,059 B1 | 5/2002 | Smith et al. |
| 6,389,114 B1 | 5/2002 | Dowens et al. |
| 6,393,007 B1 | 5/2002 | Haartsen |
| 6,393,014 B1 | 5/2002 | Daly et al. |
| 6,393,017 B1 | 5/2002 | Galvin |
| 6,404,735 B1 | 6/2002 | Beshai et al. |
| 6,415,158 B1 | 7/2002 | King et al. |
| 6,415,410 B1 | 7/2002 | Kanerva et al. |
| 6,418,139 B1 | 7/2002 | Akhtar |
| 6,418,146 B1 | 7/2002 | Miloslavsky |
| 6,421,425 B1 | 7/2002 | Bossi et al. |
| 6,424,646 B1 | 7/2002 | Gerszberg et al. |
| 6,425,131 B2 | 7/2002 | Crandall et al. |
| 6,426,819 B1 | 7/2002 | Crimmins et al. |
| 6,430,395 B2 | 8/2002 | Arazi et al. |
| 6,434,389 B1 | 8/2002 | Meskanen et al. |
| 6,437,692 B1 | 8/2002 | Petite et al. |
| 6,438,117 B1 | 8/2002 | Grilli et al. |
| 6,438,222 B1 | 8/2002 | Burg |
| 6,438,223 B1 | 8/2002 | Eskafi et al. |
| 6,438,369 B1 | 8/2002 | Huang et al. |
| 6,438,383 B1 | 8/2002 | Hall et al. |
| 6,442,266 B1 | 8/2002 | Wu |
| 6,445,921 B1 | 9/2002 | Bell |
| 6,449,766 B1 | 9/2002 | Fleming |
| 6,452,923 B1 | 9/2002 | Gerszberg et al. |
| 6,456,699 B1 | 9/2002 | Burg et al. |
| 6,459,913 B2 | 10/2002 | Cloutier |
| 6,463,307 B1 | 10/2002 | Larsson et al. |
| 6,467,090 B1 | 10/2002 | Brodigan |
| 6,480,748 B1 | 11/2002 | Gerszberg et al. |
| 6,490,274 B1 | 12/2002 | Kim |
| 6,493,324 B1 | 12/2002 | Truetken |
| 6,493,629 B1 | 12/2002 | Van Bosch |
| 6,498,934 B1 | 12/2002 | Muller |
| 6,501,740 B1 | 12/2002 | Sun et al. |
| 6,505,348 B1 | 1/2003 | Knowles et al. |
| 6,510,152 B1 | 1/2003 | Gerszberg et al. |
| 6,519,246 B1 | 2/2003 | Strahs |
| 6,519,249 B1 | 2/2003 | Bennefeld et al. |
| 6,522,628 B1 | 2/2003 | Patel et al. |
| 6,532,286 B1 | 3/2003 | Burg |
| 6,539,237 B1 | 3/2003 | Sayers et al. |
| 6,542,500 B1 | 4/2003 | Gerszberg et al. |
| 6,542,516 B1 | 4/2003 | Vialen et al. |
| 6,549,944 B1 | 4/2003 | Weinberg et al. |
| 6,553,219 B1 | 4/2003 | Vilander et al. |
| 6,556,553 B1 | 4/2003 | Palmer et al. |
| 6,556,822 B1 | 4/2003 | Matsumoto |
| 6,556,825 B1 | 4/2003 | Mansfield |
| 6,556,830 B1 | 4/2003 | Lenzo |
| 6,557,055 B1 | 4/2003 | Wiese |
| 6,560,222 B1 | 5/2003 | Pounds et al. |
| 6,570,855 B1 | 5/2003 | Kung et al. |
| 6,570,974 B1 | 5/2003 | Gerszberg et al. |
| 6,574,266 B1 | 6/2003 | Haartsen |
| 6,587,444 B1 | 7/2003 | Lenzo et al. |
| 6,587,782 B1 | 7/2003 | Nocek et al. |
| 6,590,867 B1 | 7/2003 | Ash et al. |
| 6,600,925 B1 | 7/2003 | Rams |
| 6,621,895 B1 | 9/2003 | Giese |
| 6,631,010 B1 | 10/2003 | Foster et al. |
| 6,633,614 B1 | 10/2003 | Barton et al. |
| 6,633,635 B2 | 10/2003 | Kung et al. |
| 6,633,761 B1 | 10/2003 | Singhal et al. |
| 6,633,848 B1 | 10/2003 | Johnson et al. |
| 6,640,239 B1 | 10/2003 | Gidwani |
| 6,643,512 B1 | 11/2003 | Ramaswamy |
| 6,647,426 B2 | 11/2003 | Mohammed |
| 6,650,901 B1 | 11/2003 | Schuster et al. |
| 6,654,589 B1 | 11/2003 | Haumont |
| 6,654,610 B1 | 11/2003 | Chen et al. |
| 6,657,981 B1 | 12/2003 | Lee et al. |
| 6,658,250 B1 | 12/2003 | Ganesan et al. |
| 6,665,276 B1 | 12/2003 | Culbertson et al. |
| 6,671,506 B1 | 12/2003 | Lee |
| 6,675,009 B1 | 1/2004 | Cook |
| 6,678,357 B2 | 1/2004 | Stumer et al. |
| 6,680,923 B1 | 1/2004 | Leon |
| 6,683,853 B1 | 1/2004 | Kannas et al. |
| 6,687,360 B2 | 2/2004 | Kung et al. |
| 6,690,675 B1 | 2/2004 | Kung et al. |
| 6,708,033 B1 | 3/2004 | Linkola et al. |
| 6,711,400 B1 | 3/2004 | Aura |
| 6,728,672 B1 | 4/2004 | Will |
| 6,734,867 B1 | 5/2004 | Munshi et al. |
| 6,744,767 B1 | 6/2004 | Chiu et al. |
| 6,757,740 B1 | 6/2004 | Parekh et al. |
| 6,766,160 B1 | 7/2004 | Lemilainen et al. |
| 6,771,742 B2 * | 8/2004 | McCalmont | H04M 3/42 379/45 |
| 6,775,267 B1 | 8/2004 | Kung et al. |
| 6,785,535 B2 | 8/2004 | Lucidarme et al. |
| 6,788,656 B1 | 9/2004 | Smolentzov et al. |
| 6,799,049 B1 | 9/2004 | Zellner et al. |
| 6,801,519 B1 | 10/2004 | Mangal |
| 6,801,772 B1 | 10/2004 | Townend et al. |
| 6,801,777 B2 | 10/2004 | Rusch |
| 6,807,417 B2 | 10/2004 | Sallinen et al. |
| 6,816,469 B1 | 11/2004 | Kung et al. |
| 6,823,154 B2 | 11/2004 | Koga et al. |
| 6,823,260 B1 | 11/2004 | Turcotte |
| 6,824,048 B1 | 11/2004 | Itabashi et al. |
| 6,826,154 B2 | 11/2004 | Subbiah et al. |
| 6,826,173 B1 | 11/2004 | Kung et al. |
| 6,829,227 B1 | 12/2004 | Pitt et al. |
| 6,836,476 B1 | 12/2004 | Dunn et al. |
| 6,839,356 B2 | 1/2005 | Barany et al. |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch et al. |
| 6,850,525 B2 | 2/2005 | Mitsumori et al. |
| 6,853,851 B1 | 2/2005 | Rautiola et al. |
| 6,879,568 B1 | 4/2005 | Xu et al. |
| 6,879,600 B1 | 4/2005 | Jones et al. |
| 6,888,811 B2 | 5/2005 | Eaton et al. |
| 6,889,137 B1 * | 5/2005 | Rychlak | G01C 21/3407 340/286.07 |
| 6,889,321 B1 | 5/2005 | Kung et al. |

(56) References Cited

U.S. PATENT DOCUMENTS

| | | | |
|---|---|---|---|
| 6,895,255 B1 | 5/2005 | Bridgelall | |
| 6,904,176 B1 | 6/2005 | Chui et al. | |
| 6,907,004 B1 | 6/2005 | Ramsey et al. | |
| 6,909,705 B1 | 6/2005 | Lee et al. | |
| 6,910,074 B1 | 6/2005 | Amin et al. | |
| 6,912,545 B1 | 6/2005 | Lundy et al. | |
| 6,914,964 B1 | 7/2005 | Levine | |
| 6,922,559 B2 | 7/2005 | Mohammed | |
| 6,925,074 B1 | 8/2005 | Vikberg et al. | |
| 6,937,713 B1 | 8/2005 | Kung et al. | |
| 6,937,862 B2 | 8/2005 | Back et al. | |
| 6,940,950 B2* | 9/2005 | Dickinson | H04L 12/66 379/45 |
| 6,957,249 B2 | 10/2005 | Salo et al. | |
| 6,961,573 B1 | 11/2005 | Moon et al. | |
| 6,963,557 B2* | 11/2005 | Knox | H04L 12/6402 370/352 |
| 6,963,981 B1 | 11/2005 | Bailey et al. | |
| 6,970,719 B1 | 11/2005 | McConnell et al. | |
| 6,986,154 B1 | 1/2006 | Price et al. | |
| 6,993,359 B1 | 1/2006 | Nelakanti et al. | |
| 6,996,087 B2 | 2/2006 | Ejzak | |
| 7,006,614 B2 | 2/2006 | Feinberg et al. | |
| 7,009,952 B1 | 3/2006 | Razavilar et al. | |
| 7,027,564 B2 | 4/2006 | James | |
| 7,028,186 B1 | 4/2006 | Stenman et al. | |
| 7,035,932 B1 | 4/2006 | Dowling | |
| 7,039,025 B1 | 5/2006 | Menon et al. | |
| 7,039,027 B2 | 5/2006 | Bridgelall | |
| 7,042,985 B1* | 5/2006 | Wright | H04M 7/006 370/352 |
| 7,043,235 B2 | 5/2006 | Meyer et al. | |
| 7,054,290 B1 | 5/2006 | Djuphammar | |
| 7,054,313 B1 | 5/2006 | Gerszberg et al. | |
| 7,054,627 B1 | 5/2006 | Hillman | |
| 7,062,572 B1 | 6/2006 | Hampton | |
| 7,065,353 B1 | 6/2006 | Bolinth et al. | |
| 7,068,594 B1 | 6/2006 | Tasker | |
| 7,069,022 B2 | 6/2006 | Rajaniemi et al. | |
| 7,092,370 B2 | 8/2006 | Jiang et al. | |
| 7,099,339 B1 | 8/2006 | Wang et al. | |
| 7,099,443 B2 | 8/2006 | Phillips et al. | |
| 7,107,055 B2 | 9/2006 | Gallagher et al. | |
| 7,110,395 B1 | 9/2006 | Blair | |
| 7,127,044 B1 | 10/2006 | Becker et al. | |
| 7,127,250 B2 | 10/2006 | Gallagher et al. | |
| 7,149,499 B1 | 12/2006 | Oran et al. | |
| 7,149,521 B2 | 12/2006 | Sundar et al. | |
| 7,149,807 B1 | 12/2006 | Kontothanassis | |
| 7,171,199 B1 | 1/2007 | Rahman | |
| 7,171,205 B2 | 1/2007 | Gallagher et al. | |
| 7,177,399 B2 | 2/2007 | Dawson et al. | |
| 7,180,988 B2 | 2/2007 | Phillips et al. | |
| 7,181,401 B2 | 2/2007 | Johnson et al. | |
| 7,194,512 B1* | 3/2007 | Creemer | G06Q 30/0226 709/205 |
| 7,197,309 B2 | 3/2007 | Gallagher et al. | |
| 7,200,112 B2 | 4/2007 | Sundar et al. | |
| 7,200,399 B2 | 4/2007 | Gallagher et al. | |
| 7,200,673 B1 | 4/2007 | Augart | |
| 7,209,744 B2 | 4/2007 | Gallagher et al. | |
| 7,212,819 B2 | 5/2007 | Gallagher et al. | |
| 7,215,961 B2 | 5/2007 | Gallagher et al. | |
| 7,231,046 B1 | 6/2007 | Einola et al. | |
| 7,236,787 B1 | 6/2007 | Tamura et al. | |
| 7,239,698 B2 | 7/2007 | Phillips et al. | |
| 7,245,916 B2 | 7/2007 | Gallagher et al. | |
| 7,251,227 B2 | 7/2007 | de Jong et al. | |
| 7,257,387 B2 | 8/2007 | Laliberte | |
| 7,260,186 B1 | 8/2007 | Zhu et al. | |
| 7,272,397 B2 | 9/2007 | Gallagher et al. | |
| 7,283,821 B2 | 10/2007 | Gallagher et al. | |
| 7,283,822 B2 | 10/2007 | Gallagher et al. | |
| 7,283,823 B2 | 10/2007 | Pearce et al. | |
| 7,307,963 B2 | 12/2007 | Chow et al. | |
| 7,308,263 B2 | 12/2007 | Gallagher et al. | |
| 7,324,818 B2 | 1/2008 | Gallagher et al. | |
| 7,330,464 B2 | 2/2008 | Brouwer et al. | |
| 7,339,924 B1 | 3/2008 | Chung et al. | |
| 7,349,412 B1 | 3/2008 | Jones et al. | |
| 7,349,698 B2 | 3/2008 | Gallagher et al. | |
| 7,356,145 B2 | 4/2008 | Ala-Laurila et al. | |
| 7,366,157 B1 | 4/2008 | Valentine et al. | |
| 7,369,854 B2 | 5/2008 | Gallagher et al. | |
| 7,369,859 B2 | 5/2008 | Gallagher | |
| 7,379,436 B2 | 5/2008 | Jiang | |
| 7,379,455 B2 | 5/2008 | Pickett | |
| 7,389,412 B2 | 6/2008 | Sharma et al. | |
| 7,391,761 B1 | 6/2008 | Ruckart et al. | |
| 7,420,964 B2 | 9/2008 | Narvanen et al. | |
| 7,433,675 B2 | 10/2008 | Lucidarme et al. | |
| 7,437,162 B1 | 10/2008 | Zhang et al. | |
| 7,440,472 B2 | 10/2008 | Delaney et al. | |
| 7,441,043 B1 | 10/2008 | Henry et al. | |
| 7,453,990 B2* | 11/2008 | Welenson | H04M 7/122 370/352 |
| 7,454,207 B2 | 11/2008 | Gallagher et al. | |
| 7,471,655 B2 | 12/2008 | Gallagher et al. | |
| 7,474,742 B2 | 1/2009 | Cook | |
| 7,496,360 B2 | 2/2009 | Sindhwani et al. | |
| 7,508,928 B1* | 3/2009 | Everson | H04M 1/2535 370/352 |
| 7,558,584 B2 | 7/2009 | Yamamoto et al. | |
| 7,564,835 B1* | 7/2009 | Grabelsky | H04L 45/00 370/352 |
| 7,565,145 B2 | 7/2009 | Gallagher et al. | |
| 7,573,982 B2 | 8/2009 | Breen et al. | |
| 7,573,988 B2 | 8/2009 | Lee et al. | |
| 7,574,213 B2 | 8/2009 | Gallagher et al. | |
| 7,580,405 B2* | 8/2009 | Laliberte | H04M 7/006 370/389 |
| 7,580,424 B2 | 8/2009 | Ravishankar et al. | |
| 7,586,902 B2* | 9/2009 | Epley | H04L 29/06027 340/539.18 |
| 7,606,190 B2 | 10/2009 | Markovic et al. | |
| 7,633,909 B1 | 12/2009 | Jones et al. | |
| 7,634,269 B2 | 12/2009 | Gallagher | |
| 7,640,008 B2 | 12/2009 | Gallagher et al. | |
| 7,640,036 B2 | 12/2009 | Kallio | |
| 7,684,803 B2 | 3/2010 | Gallagher et al. | |
| 7,746,905 B2 | 6/2010 | Binder | |
| 7,769,379 B2 | 8/2010 | Suumaki et al. | |
| 7,769,385 B2 | 8/2010 | Gallagher et al. | |
| 7,773,993 B2 | 8/2010 | Gallagher et al. | |
| 7,796,738 B2 | 9/2010 | Wright | |
| 7,843,923 B2 | 11/2010 | Baum | |
| 7,843,934 B2* | 11/2010 | Baum | H04L 29/12018 370/395.2 |
| 7,852,817 B2 | 12/2010 | Gallagher et al. | |
| 7,873,015 B2 | 1/2011 | Gallagher et al. | |
| 7,885,644 B2 | 2/2011 | Gallagher et al. | |
| 7,912,004 B2 | 3/2011 | Gallagher et al. | |
| 7,929,977 B2 | 4/2011 | Gallagher | |
| 7,933,598 B1 | 4/2011 | Agrawal et al. | |
| 7,940,746 B2 | 5/2011 | Livingood | |
| 7,949,326 B2 | 5/2011 | Gallagher et al. | |
| 7,953,423 B2 | 5/2011 | Gallagher et al. | |
| 7,957,348 B1 | 6/2011 | Gallagher et al. | |
| 7,974,270 B2 | 7/2011 | Goel et al. | |
| 7,974,624 B2 | 7/2011 | Gallagher et al. | |
| 8,005,076 B2 | 8/2011 | Gallagher et al. | |
| 8,027,691 B2 | 9/2011 | Bernas et al. | |
| 8,095,115 B2 | 1/2012 | van de Groenendaal | |
| 8,130,703 B2 | 3/2012 | Markovic et al. | |
| 8,165,585 B2 | 4/2012 | Gallagher et al. | |
| 8,175,587 B2 | 5/2012 | Preece | |
| 8,265,587 B2 | 9/2012 | D'Evelyn et al. | |
| 8,553,558 B1 | 10/2013 | Dinan | |
| 8,635,661 B2 | 1/2014 | Shahbazi | |
| 8,724,522 B2 | 5/2014 | Livingood | |
| 9,036,626 B2 | 5/2015 | Livingood | |
| 9,049,132 B1 | 6/2015 | Livingood | |
| 9,055,550 B1 | 6/2015 | Livingood | |
| 2001/0004382 A1 | 6/2001 | Van Wontherghem | |

(56) References Cited

U.S. PATENT DOCUMENTS

| | | |
|---|---|---|
| 2001/0029186 A1 | 10/2001 | Canyon et al. |
| 2001/0031645 A1 | 10/2001 | Jarrett |
| 2001/0046214 A1 | 11/2001 | Kang |
| 2001/0046860 A1 | 11/2001 | Lee |
| 2001/0046863 A1 | 11/2001 | Rinne et al. |
| 2001/0049790 A1 | 12/2001 | Faccin et al. |
| 2001/0055298 A1 | 12/2001 | Baker et al. |
| 2002/0009199 A1 | 1/2002 | Ala-Laurila et al. |
| 2002/0013941 A1 | 1/2002 | Ward et al. |
| 2002/0032030 A1 | 3/2002 | Berglund et al. |
| 2002/0035699 A1 | 3/2002 | Crosbie |
| 2002/0036983 A1 | 3/2002 | Widegren et al. |
| 2002/0045459 A1 | 4/2002 | Morikawa |
| 2002/0051431 A1 | 5/2002 | Choi et al. |
| 2002/0051463 A1 | 5/2002 | Higuchi |
| 2002/0056112 A1 | 5/2002 | Dureau et al. |
| 2002/0058515 A1 | 5/2002 | Holler et al. |
| 2002/0059516 A1 | 5/2002 | Turtiainen et al. |
| 2002/0065099 A1 | 5/2002 | Bjorndahl |
| 2002/0065935 A1 | 5/2002 | Koperda et al. |
| 2002/0066036 A1 | 5/2002 | Makineni et al. |
| 2002/0075844 A1 | 6/2002 | Hagen |
| 2002/0077584 A1 | 6/2002 | Lin et al. |
| 2002/0080797 A1 | 6/2002 | Kim |
| 2002/0082015 A1 | 6/2002 | Wu |
| 2002/0085516 A1 | 7/2002 | Bridgelall |
| 2002/0086682 A1 | 7/2002 | Naghian |
| 2002/0087666 A1 | 7/2002 | Huffman et al. |
| 2002/0095599 A1 | 7/2002 | Hong et al. |
| 2002/0102974 A1 | 8/2002 | Raith |
| 2002/0114322 A1 | 8/2002 | Xu et al. |
| 2002/0118674 A1 | 8/2002 | Faccin et al. |
| 2002/0120749 A1 | 8/2002 | Widegren et al. |
| 2002/0123325 A1 | 9/2002 | Cooper |
| 2002/0131387 A1 | 9/2002 | Pitcher et al. |
| 2002/0131396 A1 | 9/2002 | Knuutila et al. |
| 2002/0132630 A1 | 9/2002 | Arazi et al. |
| 2002/0141393 A1 | 10/2002 | Eriksson et al. |
| 2002/0142761 A1 | 10/2002 | Wallstedt et al. |
| 2002/0143874 A1 | 10/2002 | Marquette et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor et al. |
| 2002/0156646 A1 | 10/2002 | Kaiwa et al. |
| 2002/0160811 A1 | 10/2002 | Jannette et al. |
| 2002/0161905 A1 | 10/2002 | Haverinen et al. |
| 2002/0162116 A1 | 10/2002 | Read et al. |
| 2002/0164984 A1 | 11/2002 | Thakker |
| 2002/0164993 A1 | 11/2002 | Elliot |
| 2002/0166068 A1 | 11/2002 | Kilgore |
| 2002/0168959 A1 | 11/2002 | Noguchi et al. |
| 2002/0172209 A1 | 11/2002 | Ohta et al. |
| 2002/0186684 A1 | 12/2002 | Shaughnessy et al. |
| 2002/0187780 A1 | 12/2002 | Souissi |
| 2002/0191556 A1 | 12/2002 | Krishnarajah et al. |
| 2002/0191575 A1 | 12/2002 | Kalavade et al. |
| 2002/0191595 A1 | 12/2002 | Mar et al. |
| 2002/0196840 A1 | 12/2002 | Anderson et al. |
| 2002/0197984 A1 | 12/2002 | Monin et al. |
| 2003/0007475 A1 | 1/2003 | Tsuda et al. |
| 2003/0013458 A1 | 1/2003 | Yabe et al. |
| 2003/0018480 A1 | 1/2003 | Mecayten |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer |
| 2003/0065442 A1 | 4/2003 | Touney |
| 2003/0072306 A1* | 4/2003 | Hunzinger .............. G01S 5/02 370/389 |
| 2003/0081377 A1 | 5/2003 | Lin |
| 2003/0087653 A1 | 5/2003 | Leung et al. |
| 2003/0092445 A1 | 5/2003 | Timonen et al. |
| 2003/0093563 A1 | 5/2003 | Young et al. |
| 2003/0101356 A1 | 5/2003 | Miettinen et al. |
| 2003/0104822 A1 | 6/2003 | Bentley |
| 2003/0108176 A1 | 6/2003 | Kung et al. |
| 2003/0112789 A1 | 6/2003 | Heinonen et al. |
| 2003/0114158 A1 | 6/2003 | Soderbacka et al. |
| 2003/0119480 A1 | 6/2003 | Mohammed |
| 2003/0119489 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0119557 A1 | 6/2003 | Lundby |
| 2003/0120817 A1 | 6/2003 | Ott et al. |
| 2003/0130005 A1 | 7/2003 | Weisshaar et al. |
| 2003/0130008 A1 | 7/2003 | Rajaniemi et al. |
| 2003/0133558 A1 | 7/2003 | Kung et al. |
| 2003/0136827 A1 | 7/2003 | Kaneko et al. |
| 2003/0139180 A1 | 7/2003 | McIntosh et al. |
| 2003/0142673 A1 | 7/2003 | Patil et al. |
| 2003/0143946 A1 | 7/2003 | Grzeczkowski |
| 2003/0157922 A1 | 8/2003 | Akhteruzzaman et al. |
| 2003/0172264 A1 | 9/2003 | Dillon |
| 2003/0176181 A1 | 9/2003 | Boesjes |
| 2003/0176186 A1 | 9/2003 | Mohammed |
| 2003/0193952 A1 | 10/2003 | O'Neill |
| 2003/0202486 A1 | 10/2003 | Anton et al. |
| 2003/0204393 A1 | 10/2003 | Czerwiec et al. |
| 2003/0210199 A1 | 11/2003 | Sward et al. |
| 2003/0214939 A1 | 11/2003 | Eldumiati et al. |
| 2003/0219022 A1 | 11/2003 | Dillon et al. |
| 2003/0219024 A1 | 11/2003 | Purnadi et al. |
| 2003/0224820 A1 | 12/2003 | Einola et al. |
| 2003/0226017 A1 | 12/2003 | Palekar et al. |
| 2003/0227940 A1 | 12/2003 | Fiat |
| 2003/0231623 A1 | 12/2003 | Ryu et al. |
| 2003/0235186 A1 | 12/2003 | Park |
| 2004/0001479 A1 | 1/2004 | Pounds et al. |
| 2004/0001501 A1 | 1/2004 | Delveaux et al. |
| 2004/0002346 A1 | 1/2004 | Santhoff |
| 2004/0008649 A1 | 1/2004 | Wybenga et al. |
| 2004/0009749 A1 | 1/2004 | Arazi et al. |
| 2004/0010620 A1 | 1/2004 | Salo et al. |
| 2004/0013099 A1 | 1/2004 | O'Neill |
| 2004/0015574 A1* | 1/2004 | Meyerson .............. H04L 51/36 709/220 |
| 2004/0025018 A1 | 2/2004 | Haas et al. |
| 2004/0037312 A1 | 2/2004 | Spear |
| 2004/0038664 A1 | 2/2004 | Stoks |
| 2004/0053623 A1 | 3/2004 | Hoff et al. |
| 2004/0057425 A1 | 3/2004 | Brouwer et al. |
| 2004/0063451 A1 | 4/2004 | Bonta et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0073597 A1 | 4/2004 | Caveney et al. |
| 2004/0077335 A1 | 4/2004 | Lee et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0087319 A1 | 5/2004 | Bos et al. |
| 2004/0116120 A1 | 6/2004 | Gallagher et al. |
| 2004/0125819 A1 | 7/2004 | Binder |
| 2004/0140928 A1 | 7/2004 | Cleghorn |
| 2004/0147223 A1 | 7/2004 | Cho |
| 2004/0151168 A1 | 8/2004 | Phillips et al. |
| 2004/0151290 A1 | 8/2004 | Magarasevic et al. |
| 2004/0153577 A1 | 8/2004 | Phillips et al. |
| 2004/0162105 A1 | 8/2004 | Reddy et al. |
| 2004/0171378 A1 | 9/2004 | Rautila |
| 2004/0176085 A1 | 9/2004 | Phillips et al. |
| 2004/0185853 A1 | 9/2004 | Kim et al. |
| 2004/0190497 A1 | 9/2004 | Knox |
| 2004/0192211 A1 | 9/2004 | Gallagher et al. |
| 2004/0196864 A1 | 10/2004 | Benveniste |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203788 A1 | 10/2004 | Fors et al. |

(56) References Cited

U.S. PATENT DOCUMENTS

| | | |
|---|---|---|
| 2004/0203800 A1 | 10/2004 | Myhre et al. |
| 2004/0203815 A1 | 10/2004 | Shoemake et al. |
| 2004/0203896 A1 | 10/2004 | Deigin et al. |
| 2004/0218563 A1 | 11/2004 | Porter et al. |
| 2004/0219948 A1 | 11/2004 | Jones et al. |
| 2004/0228336 A1 | 11/2004 | Kung et al. |
| 2004/0240525 A1 | 12/2004 | Karabinis et al. |
| 2004/0259541 A1 | 12/2004 | Hicks et al. |
| 2004/0259572 A1 | 12/2004 | Aoki et al. |
| 2004/0264410 A1 | 12/2004 | Sagi et al. |
| 2005/0002407 A1 | 1/2005 | Shaheen et al. |
| 2005/0003819 A1 | 1/2005 | Wu |
| 2005/0020280 A1 | 1/2005 | Holland et al. |
| 2005/0026589 A1 | 2/2005 | Holland et al. |
| 2005/0041787 A1 | 2/2005 | Casey et al. |
| 2005/0063519 A1* | 3/2005 | James .............. H04L 29/06027 379/45 |
| 2005/0064896 A1 | 3/2005 | Rautiola et al. |
| 2005/0070283 A1 | 3/2005 | Hashimoto et al. |
| 2005/0070288 A1 | 3/2005 | Belkin et al. |
| 2005/0073964 A1 | 4/2005 | Schmidt et al. |
| 2005/0083912 A1 | 4/2005 | Afshar et al. |
| 2005/0101245 A1 | 5/2005 | Ahmavaara |
| 2005/0101329 A1 | 5/2005 | Gallagher |
| 2005/0111409 A1 | 5/2005 | Spear et al. |
| 2005/0130654 A1 | 6/2005 | Di Claudio et al. |
| 2005/0130659 A1 | 6/2005 | Grech et al. |
| 2005/0141431 A1 | 6/2005 | Caveney et al. |
| 2005/0144645 A1 | 6/2005 | Casey et al. |
| 2005/0144647 A1 | 6/2005 | Zussman et al. |
| 2005/0160161 A1 | 7/2005 | Barrett et al. |
| 2005/0181805 A1 | 8/2005 | Gallagher |
| 2005/0184145 A1 | 8/2005 | Law et al. |
| 2005/0186948 A1 | 8/2005 | Gallagher et al. |
| 2005/0192999 A1 | 9/2005 | Cook et al. |
| 2005/0198199 A1 | 9/2005 | Dowling |
| 2005/0198306 A1 | 9/2005 | Palojarvi et al. |
| 2005/0198374 A1 | 9/2005 | Suzuki |
| 2005/0207395 A1 | 9/2005 | Mohammed |
| 2005/0213546 A1 | 9/2005 | Reitter et al. |
| 2005/0213565 A1 | 9/2005 | Barclay et al. |
| 2005/0213716 A1* | 9/2005 | Zhu .................. H04L 29/06027 379/45 |
| 2005/0239441 A1 | 10/2005 | Eronen |
| 2005/0239453 A1 | 10/2005 | Vikberg et al. |
| 2005/0239468 A1 | 10/2005 | Segal |
| 2005/0243973 A1 | 11/2005 | Laliberte |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272424 A1 | 12/2005 | Gallagher et al. |
| 2005/0272425 A1 | 12/2005 | Amerga et al. |
| 2005/0272449 A1 | 12/2005 | Gallagher et al. |
| 2005/0277427 A1* | 12/2005 | Zhang .................. H04W 64/00 455/456.1 |
| 2005/0286132 A1 | 12/2005 | Tonar et al. |
| 2005/0286466 A1 | 12/2005 | Tagg et al. |
| 2005/0286711 A1 | 12/2005 | Lee et al. |
| 2006/0009190 A1* | 1/2006 | Laliberte .......... H04L 29/06027 455/404.1 |
| 2006/0009201 A1 | 1/2006 | Gallagher et al. |
| 2006/0009202 A1 | 1/2006 | Gallagher et al. |
| 2006/0019656 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks |
| 2006/0021036 A1 | 1/2006 | Chang et al. |
| 2006/0025143 A1 | 2/2006 | Gallagher et al. |
| 2006/0025144 A1 | 2/2006 | Gallagher et al. |
| 2006/0025145 A1 | 2/2006 | Gallagher et al. |
| 2006/0025146 A1 | 2/2006 | Gallagher et al. |
| 2006/0025147 A1 | 2/2006 | Gallagher et al. |
| 2006/0035645 A1 | 2/2006 | Kim |
| 2006/0050667 A1 | 3/2006 | Verma et al. |
| 2006/0056388 A1* | 3/2006 | Livingood ............ H04L 41/12 370/352 |
| 2006/0063544 A1 | 3/2006 | Zhao et al. |
| 2006/0075073 A1 | 4/2006 | Bichot |
| 2006/0079258 A1 | 4/2006 | Gallagher et al. |
| 2006/0079259 A1 | 4/2006 | Gallagher et al. |
| 2006/0079273 A1 | 4/2006 | Gallagher et al. |
| 2006/0079274 A1 | 4/2006 | Gallagher et al. |
| 2006/0094431 A1 | 5/2006 | Saifullah et al. |
| 2006/0098598 A1 | 5/2006 | Gallagher |
| 2006/0099935 A1 | 5/2006 | Gallagher et al. |
| 2006/0114871 A1 | 6/2006 | Buckley et al. |
| 2006/0116125 A1 | 6/2006 | Buckley et al. |
| 2006/0120517 A1 | 6/2006 | Moon et al. |
| 2006/0133393 A1 | 6/2006 | Yun |
| 2006/0143278 A1 | 6/2006 | Bauchot et al. |
| 2006/0146803 A1 | 7/2006 | Bae et al. |
| 2006/0148511 A1 | 7/2006 | Bender et al. |
| 2006/0153110 A1 | 7/2006 | Morgan et al. |
| 2006/0166687 A1 | 7/2006 | Edman |
| 2006/0174015 A1 | 8/2006 | Arauz-Rosado |
| 2006/0179474 A1 | 8/2006 | Bichot |
| 2006/0183482 A1 | 8/2006 | Ueda |
| 2006/0188073 A1 | 8/2006 | Wright |
| 2006/0189319 A1 | 8/2006 | Houldsworth et al. |
| 2006/0198347 A1 | 9/2006 | Hurtta et al. |
| 2006/0223532 A1 | 10/2006 | Liu et al. |
| 2006/0239277 A1 | 10/2006 | Gallagher |
| 2006/0262778 A1 | 11/2006 | Haumont et al. |
| 2006/0262913 A1 | 11/2006 | Cook et al. |
| 2006/0264204 A1 | 11/2006 | Livingood |
| 2006/0268845 A1 | 11/2006 | He et al. |
| 2006/0271632 A1 | 11/2006 | Livingood |
| 2006/0274725 A1 | 12/2006 | Freitag et al. |
| 2006/0276137 A1 | 12/2006 | Pummill et al. |
| 2006/0276139 A1 | 12/2006 | Pummill et al. |
| 2006/0286981 A1 | 12/2006 | Suumaki et al. |
| 2006/0291455 A1 | 12/2006 | Katz et al. |
| 2006/0293024 A1 | 12/2006 | Benco et al. |
| 2007/0004405 A1 | 1/2007 | Buckley et al. |
| 2007/0013516 A1 | 1/2007 | Freitag et al. |
| 2007/0030841 A1 | 2/2007 | Lee et al. |
| 2007/0054668 A1 | 3/2007 | Scheinert et al. |
| 2007/0092070 A1 | 4/2007 | Croy et al. |
| 2007/0147345 A1 | 6/2007 | Lowmaster |
| 2007/0183427 A1 | 8/2007 | Nylander et al. |
| 2007/0202891 A1 | 8/2007 | Diachina et al. |
| 2007/0232312 A1 | 10/2007 | Gallagher et al. |
| 2007/0233899 A1 | 10/2007 | Aborn |
| 2007/0238448 A1 | 10/2007 | Gallagher et al. |
| 2007/0242672 A1 | 10/2007 | Grayson et al. |
| 2007/0243872 A1 | 10/2007 | Gallagher et al. |
| 2007/0259645 A1 | 11/2007 | Laliberte |
| 2007/0259673 A1 | 11/2007 | Willars et al. |
| 2007/0268855 A1 | 11/2007 | Grayson et al. |
| 2007/0286132 A1 | 12/2007 | Vikberg et al. |
| 2007/0287459 A1 | 12/2007 | Diachina et al. |
| 2007/0293222 A1 | 12/2007 | Vikberg et al. |
| 2008/0026781 A1 | 1/2008 | Ho et al. |
| 2008/0076420 A1 | 3/2008 | Khetawat et al. |
| 2008/0089488 A1* | 4/2008 | Brunson .......... H04L 29/06027 379/88.12 |
| 2008/0101301 A1 | 5/2008 | Thomas et al. |
| 2008/0102794 A1 | 5/2008 | Keevill et al. |
| 2008/0102801 A1 | 5/2008 | Lazaridis et al. |
| 2008/0108319 A1 | 5/2008 | Gallagher |
| 2008/0117841 A1 | 5/2008 | Chen |
| 2008/0123596 A1 | 5/2008 | Gallagher et al. |
| 2008/0125120 A1 | 5/2008 | Gallagher et al. |
| 2008/0130564 A1 | 6/2008 | Gallagher et al. |
| 2008/0130568 A1 | 6/2008 | Gallagher et al. |
| 2008/0132239 A1 | 6/2008 | Khetawat et al. |
| 2008/0165725 A1 | 7/2008 | Huomo et al. |
| 2008/0207170 A1 | 8/2008 | Khetawat et al. |
| 2008/0219218 A1 | 9/2008 | Rydnell et al. |
| 2008/0242298 A1 | 10/2008 | Nylander et al. |
| 2008/0254833 A1 | 10/2008 | Keevill et al. |
| 2008/0261596 A1 | 10/2008 | Khetawat et al. |
| 2008/0299976 A1 | 12/2008 | Gallagher et al. |

(56) References Cited

U.S. PATENT DOCUMENTS

| | | |
|---|---|---|
| 2008/0299977 A1 | 12/2008 | Gallagher et al. |
| 2008/0301322 A1 | 12/2008 | Horibe |
| 2008/0311916 A1 | 12/2008 | Gallagher et al. |
| 2008/0318599 A1 | 12/2008 | Gallagher et al. |
| 2009/0054070 A1 | 2/2009 | Gallagher et al. |
| 2009/0075660 A1 | 3/2009 | Hallenstal et al. |
| 2009/0149157 A9 | 6/2009 | Gallagher et al. |
| 2009/0149195 A1 | 6/2009 | Zhu |
| 2009/0181687 A1 | 7/2009 | Tiirola et al. |
| 2009/0262704 A1 | 10/2009 | Khetawat et al. |
| 2009/0274145 A1 | 11/2009 | Laliberte |
| 2010/0003983 A1 | 1/2010 | Gallagher et al. |
| 2010/0029246 A1 | 2/2010 | Binning |
| 2010/0040023 A1 | 2/2010 | Gallagher et al. |
| 2010/0041387 A1 | 2/2010 | Khetawat et al. |
| 2010/0041402 A1 | 2/2010 | Gallagher et al. |
| 2010/0041403 A1 | 2/2010 | Khetawat et al. |
| 2010/0041405 A1 | 2/2010 | Gallagher et al. |
| 2011/0069183 A1 | 3/2011 | Edwards et al. |
| 2011/0116420 A1 | 5/2011 | Livingood |
| 2011/0182243 A1 | 7/2011 | Gallagher et al. |
| 2011/0194493 A1 | 8/2011 | Centonza et al. |
| 2011/0249641 A1 | 10/2011 | Kwon et al. |
| 2012/0013702 A1 | 1/2012 | Livingood |
| 2012/0170497 A1 | 7/2012 | Zhang et al. |
| 2012/0176967 A1 | 7/2012 | Kim et al. |
| 2012/0257601 A1 | 10/2012 | Kim et al. |
| 2013/0010711 A1 | 1/2013 | Larsson et al. |
| 2013/0028198 A1 | 1/2013 | Yamada |
| 2013/0039294 A1 | 2/2013 | Wang |
| 2013/0083675 A1 | 4/2013 | Yamada |
| 2013/0114505 A1 | 5/2013 | Haim et al. |
| 2014/0293996 A1 | 10/2014 | Livingood |
| 2015/0180727 A1 | 6/2015 | Livingood |
| 2015/0181554 A1 | 6/2015 | Livingood |
| 2015/0237469 A1 | 8/2015 | Stephens et al. |
| 2015/0271855 A1 | 9/2015 | Livingood |
| 2017/0332415 A1 | 11/2017 | Livingood |

FOREIGN PATENT DOCUMENTS

| | | | |
|---|---|---|---|
| EP | 0758175 | A1 | 2/1997 |
| EP | 0794643 | A2 | 9/1997 |
| EP | 0800325 | A2 | 10/1997 |
| EP | 0848560 | A2 | 6/1998 |
| EP | 0856981 | A2 | 8/1998 |
| EP | 0905959 | A2 | 3/1999 |
| EP | 0936777 | A1 | 8/1999 |
| EP | 1207708 | A1 | 5/2002 |
| EP | 1703673 | A1 | 9/2006 |
| EP | 1741238 | A1 | 1/2007 |
| EP | 1749371 | A1 | 2/2007 |
| EP | 1749372 | A2 | 2/2007 |
| EP | 2044715 | A2 | 4/2009 |
| EP | 2060130 | A2 | 5/2009 |
| EP | 2074839 | A2 | 7/2009 |
| EP | 2115946 | A2 | 11/2009 |
| EP | 2282735 | A1 | 2/2011 |
| EP | 2293640 | A2 | 3/2011 |
| EP | 2293645 | A2 | 3/2011 |
| GB | 2282735 | A | 4/1995 |
| GB | 2315193 | A | 1/1998 |
| WO | 9204796 | A1 | 3/1992 |
| WO | 9518501 | A1 | 7/1995 |
| WO | 9714238 | A1 | 4/1997 |
| WO | 9716007 | A1 | 5/1997 |
| WO | 9724004 | A1 | 7/1997 |
| WO | 9737483 | A1 | 10/1997 |
| WO | 9746073 | A2 | 12/1997 |
| WO | 9747118 | A1 | 12/1997 |
| WO | 9747119 | A1 | 12/1997 |
| WO | 9747127 | A1 | 12/1997 |
| WO | 9801985 | A1 | 1/1998 |
| WO | 9807266 | A1 | 2/1998 |
| WO | 9819240 | A2 | 5/1998 |
| WO | 9819448 | A1 | 5/1998 |
| WO | 9819471 | A1 | 5/1998 |
| WO | 9824224 | A1 | 6/1998 |
| WO | 9830002 | A2 | 7/1998 |
| WO | 9836551 | A1 | 8/1998 |
| WO | 9841032 | A2 | 9/1998 |
| WO | 9851063 | A1 | 11/1998 |
| WO | 9852332 | A1 | 11/1998 |
| WO | 9852339 | A1 | 11/1998 |
| WO | 9853617 | A2 | 11/1998 |
| WO | 9854871 | A1 | 12/1998 |
| WO | 9914924 | A1 | 3/1999 |
| WO | 9916201 | A2 | 4/1999 |
| WO | 9944352 | A1 | 9/1999 |
| WO | 9948312 | A1 | 9/1999 |
| WO | 9948315 | A1 | 9/1999 |
| WO | 9953719 | A1 | 10/1999 |
| WO | 0028762 | A1 | 5/2000 |
| WO | 0051387 | A1 | 8/2000 |
| WO | 0146214 | A2 | 6/2001 |
| WO | 0209448 | A2 | 1/2002 |
| WO | 0245456 | A1 | 6/2002 |
| WO | 03039009 | A2 | 5/2003 |
| WO | 03056797 | A1 | 7/2003 |
| WO | 03063404 | A2 | 7/2003 |
| WO | 03085992 | A1 | 10/2003 |
| WO | 03092312 | A1 | 11/2003 |
| WO | 03107704 | A1 | 12/2003 |
| WO | 2004002051 | A2 | 12/2003 |
| WO | 2004034219 | A2 | 4/2004 |
| WO | 2004036770 | A2 | 4/2004 |
| WO | 2004036779 | A1 | 4/2004 |
| WO | 2004039111 | A1 | 5/2004 |
| WO | 2005006597 | A1 | 1/2005 |
| WO | 2005040689 | A2 | 5/2005 |
| WO | 2005057968 | A1 | 6/2005 |
| WO | 2005060292 | A1 | 6/2005 |
| WO | 2005065214 | A2 | 7/2005 |
| WO | 2005069546 | A1 | 7/2005 |
| WO | 2005107169 | A1 | 11/2005 |
| WO | 2005107297 | A1 | 11/2005 |
| WO | 2005114918 | A2 | 12/2005 |
| WO | 2005114920 | A1 | 12/2005 |
| WO | 2005120017 | A1 | 12/2005 |
| WO | 2006053102 | A1 | 5/2006 |
| WO | 2007015071 | A2 | 2/2007 |
| WO | 2008009016 | A2 | 1/2008 |
| WO | 2008036961 | A2 | 3/2008 |
| WO | 2008055251 | A2 | 5/2008 |
| WO | 2008106360 | A2 | 9/2008 |
| WO | 2009129516 | A1 | 10/2009 |
| WO | 2010019970 | A1 | 2/2010 |
| WO | 2010104992 | A1 | 9/2010 |

OTHER PUBLICATIONS

Odlyzko, et al., A Modest Proposal for Preventing Internet Congestion, DIMACS Technical Report, pp. 1-25, Sep. 1997.
PKT-TR-ARCH-V01-991201, PacketCable 1.0 Architecture Framework Technical Report, CableLabs, pp. 1-64, Dec. 1, 1999.
Rupp et al., "Index: A Platform for Determining How People Value the Quality of their Internet Access", Proceedings of the Sixth IEEE/IFIP International Workshop on Quality of Service, Napa CA, pp. 85-90, May 1998.
Holliday, Clifford R., "The Residential Gateway", IEEE Spectrum Magazine; May 1997, pp. 29-31.
Meggers, J. et al., "Providing Video Conferencing for the Mobile User", Local Computer Networks, Proceedings 21st IEEE Conference, 1996, pp. 526-534.
Umehira, M., et al. "Wireless and IP Integrated System Architectures for Broadband Mobile Multimedia Services", Wireless Communications and Networking Conference, WCNC, 1999 IEEE, 1999, pp. 593-597.
Albrecht, Markus, et al., "IP Services Over Bluetooth: Leading the Way to a New Mobility", IEEE 1999, 10 pages.
Perkins, Charles E., "Mobile-IP, Ad-Hoc Networking, and Nomadicity", IEEE 1996, pp. 472-476.

(56) References Cited

OTHER PUBLICATIONS

Jacobs, Stuart, "Security of Current Mobile IP Solutions", IEEE 1997, pp. 1122-1128.
Deering, S., Internet RFC/STD/FYI/BCP Archives, Internet Protocol, Version 6 specification, Dec. 1995, Xerox PARC, 38 pages.
Ericsson Press Release: "Ericsson presents the Mobile@Hometm concept," Mar. 21, 2001, http://www.ericsson.com/press/archive/2001Q1/20010321-0048.html, printed Mar. 21, 2006, pp. 1-2.
Perkins, Charles E, "Simplified Routing for Mobile Computers Using TCP/IP, Wireless LAN Implementation," IBM T.J. Watson Research Center, 0-8186-2625-9/92 1992 Proceeding, IEEE Conference on Sep. 17-18, 1992, pp. 7-13.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSIStandards, European Telecommunications Standards Institute, Sophia-Antipo, FR, vol. 3—CN1,'N1, No. V560, Dec. 2002, pp. 293-317, XP014007949, ISSN: 0000-0001.
Digital Enhanced Cordless Telecommunications (DECT); Global System for Mobile Communications (GSM); DECT/GSM Interworking Profile (IWP); Access and Mapping (protocol/procedure description for 3,1 kHz speech service): ETSI EN 300 370 V1.3.1 EuropeanStandard (Telecommunications Series), European Telecommunications Standards Institute, Sophia Antipolis, FR, Jan. 2001.
Digital Enhanced Cordless Telecommunications (DECT); DECT/UMTS Interworking Profile (IWP); Part 1: General Description and Overview: ETSI TS 101 863-1 V1.1.2, Technical Specification, European Telecommunications Standards Institute, SophiaAntipolis, FR, Nov. 2001.
Radio Equipment and Systems (RES); Digital Enhanced Cordless Telecommunications/Global System for Mobile Communications (DECT/GSM) Interworking Profile; Profile Overview: ETSI Technical Report, ETR 341, Source: ETSI DECT, ICS: 33.020, Reference:DTR/RES-03058. European Telecommunications Standards Institute, Sophia Antipolis, FR, Dec. 1996, 27 pages.
"3.sup.rd Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.
Digital cellular telecommunications system (Phase 2+); Mobile radio interface layer 3 specification (3GPP TS.04.08 version 7.19.1 Release 1998), ETSI TS 100 940 V7.19.1 (Apr. 2003).
"Unlicensed Mobile Access (UMA); Architecture (Stage 2);" UMA Architecture (Stage 2) R1.0.0 (Sep. 1, 2004) Technical Specification, Sep. 1, 2004, pp. 78.
"Unlicensed Mobile Access (UMA); Protocols (Stage 3);" UMA Protocols (Stage 3) R1.0.0 (Sep. 1, 2004) Technical Specification, Sep. 1, 2004, p. 142.
"Unlicensed Mobile Access (UMA); Architecture (Stage 2);" UMA Architecture (Stage 2) R1.0.1 (Oct. 8, 2004) Technical Specification, Oct. 8, 2004, p. 80.
"Unlicensed Mobile Access (UMA); Protocols (Stage 3);" UMA Protocols (Stage 3) R1.0.1 (Oct. 8, 2004) Technical Specification, Oct. 8, 2004, p. 142.
"Unlicensed Mobile Access (UMA); Architecture (Stage 2);" UMA Architecture (Stage 2) R1.0.2 (Oct. 3, 2004) Technical Specification, Nov. 3, 2004, pp. 79.
"Unlicensed Mobile Access (UMA); Protocols (Stage 3);" UMA Protocols (Stage 3) R1.0.2 (Nov. 5, 2004) Technical Specification, Nov. 5, 2004, p. 142.
"Unlicensed Mobile Access (UMA); Architecture (Stage 2);" UMA Architecture (Stage 2) R1.0.3 (Feb. 28, 2005) Technical Specification, Feb. 28, 2005, p. 85.
"Unlicensed Mobile Access (UMA); Protocols (Stage 3);" UMA Protocols (Stage 3) R1.03 (Feb. 26, 2005) Technical Specification, Feb. 26, 2005, pp. 156.
"Unlicensed Mobile Access (UMA); Architecture (Stage 2);" UMA Architecture (Stage 2) R1.0.4 (May 2, 2005) Technical Specification, May 2, 2005, p. 87.
"Unlicensed Mobile Access (UMA); Protocols (Stage 3);" UMA Protocols (Stage 3) R1.0.4 (May 2, 2005) Technical Specification, May 2, 20005, p. 162.
"Proposal for Stage 2 description for Generic Access to A/Gb interface", Tdoc GP-050403, Jan. 24-28, 2005, pp. 1.
"3.sup.rd Generation Partnership Project; Technical Specification Group GSM/EDGE Radio Access Network; Generic Access to the A/Gb interface; Stage 2 (Release 6);" 3GPP TS 43.318 V0.4.0 (Jan 2005), Jan. 2005, p. 66.
"3.sup.rd Generation Partnership Project; Technical Specification Group GSM/EDGE Radio Access Network; Generation Access to the A/Gb interface; Stage 2 (Release 6);" 3GPP TS 43.318 V2.0.0 (Jan. 2005), Jan. 2005, p. 66.
"3.sup.rd Generation Partnership Project; Technical Specification Group GSM/EDGE Radio Access Network; Generic Access to the A/Gb interface; Stage 2 (Release 6);" 3GPP TS 43.318 V6.1.0 (Jan. 2005), Apr. 2005, p. 68.
"Proposal for Stage 3 description for Generic Access to A/Gb interface", Tdoc GP-050279, Jan. 18, 2005, p. 1.
"3.sup.rd Generation Partnership Project; Technical Specification Group GSM/EDGE Radio Access Network; Generic Access to the A/Gb interface; Mobile Generic Access Interface Layer 3 Specification (Release x);" 3GPP TS 44.318 Vx.1.0 (Jan. 2005), Jan. 2005, p. 133.
"3.sup.rd Generation Partnership Project; Technical Specification Group GSM/EDGE Radio Access Network; Generic Access to the A/Gb interface; Mobile Generic Access Interface Layer 3 Specification (Release x);" 3GPP TS 44.318 V0.4.0 (Apr. 2005), Apr. 2005, p. 153.
"3.sup.rd Generation Partnership Project; Technical Specification Group GSM/EDGE Radio Access Network; Generic Access to the A/Gb interface; Mobile Generic Access Interface Layer 3 Specification (Release 6);" 3GPP TS 44.318 V0.5.0 (Apr. 2005), Apr. 2005, p. 152.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, EuropeanTelecommunications Standard Institute, Sophia-Antipo, FR, vol. 3-SA, No. V230, Nov. 2003, XP014023920, ISSN: 0000-0001.
Digital Enhanced Cordless Telecommunications (DECT); Global System for Mobile Communications (GSM); DECT/GSM Integration Based on Dual-Mode Terminals: ETSI EN 301 242 V1.2.2 European Standard (Telecommunications Series), European TelecommunicationStandards Institute, Sophia Antipolis, FR, Sep. 1999.
"3.sup.rd Generation Partnership Project; Technical Specification Group GSM/EDGE Radio Access Network; Generic Access to the A/Gb interface; Mobile Generic Access Interface Layer 3 Specification (Release x);" 3GPP TS 44.318 V0.4.0, Apr. 2005, 161pages.
"3.sup.rd Generation Partnership Project; Technical Specification Group GSM/EDGE Radio Access Network; Generic Access to the A/Gb interface; Mobile Generic Access Interface Layer 3 Specification (Release 6);" 3GPP TS 44.318 V0.5.0, Apr. 2005, 160pages.
"3.sup.rd Generation Partnership Project; Technical Specification Group GSM/EDGE Radio Access Network; Generic Access (GA) to the A/Gb interface; Mobile GA interface layer 3 specification (Release 6);" 3GPP TS 44318 V6.0.0, Apr. 2005, 146 pages.
"Unlicensed Mobile Access (UMA); User Perspective (Stage 1);" UMA User Perspective (Stage 1) R1.0.0 Technical Specification, Sep. 1, 2004, 29 pages.
Claus Lindholt Hansen et al., "Mobile@Home—a New 1 Use Case for Bluetooth in the Access Network," LM Ericsson Business Unit Multi-Service Networks, ISSLS 2002, Apr. 14-18, 2002, Seoul, Korea, www.issls-council.org/proc02/papers/S6A3m.pdf, NPL DateUnknown, printed Dec. 8, 2003, 10 pages.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0Release (56) References Cited

OTHER PUBLICATIONS

5); ETSI Standards, European Telecommunications Standards Institute, Sophia-Antipolis, FR, Dec. 2002, pp. 293-317.

Wu, Jon C., et al., "Intelligent Handoff for Mobile Wireless Internet," Mobile Networks and Applications, Jan. 6, 2001 Kluwer Academic Publishers, Manufactured in the Netherlands (2001) pp. 67-79.

Digital Enhanced Cordless Telecommunications (DECT); DECT/UMTS Interworking Profile (IWP); Part 1: General Description and Overview; ETSI TS 101 863-1 V1.1.2, Technical Specification, European Telecommunications Standards Institute, Sophia Antipolis,FR, Nov. 2001, 38 pages.

* cited by examiner

DETERMINING A LOCATION OF A DEVICE FOR CALLING VIA AN ACCESS POINT

CROSS-REFERENCE TO RELATED APPLICATIONS

This application is a continuation of U.S. application Ser. No. 15/589,797, filed May 8, 2017, which is a continuation of U.S. application Ser. No. 14/732,229, filed Jun. 5, 2015, now U.S. Pat. No. 9,648,644, which is a continuation of U.S. application Ser. No. 14/641,203, filed Mar. 6, 2015, now U.S. Pat. No. 9,055,550, which is a continuation of U.S. application Ser. No. 14/224,785, filed Mar. 25, 2014, now U.S. Pat. No. 9,036,626, which is a continuation of U.S. application Ser. No. 13/012,959, filed on Jan. 25, 2011, now U.S. Pat. No. 8,724,522, which is a continuation of U.S. application Ser. No. 10/924,485 filed on Aug. 24, 2004, now U.S. Pat. No. 7,940,746. The entire contents of all of these priority applications are herein incorporated by reference.

FIELD OF THE INVENTION

The present invention relates to methods and systems for locating a device connected to a network, such as to locate a Voice Over Internet Protocol (VoIP) device.

BACKGROUND

Voice Over Internet Protocol (VoIP) or Internet Protocol (IP) Telephony is a technology that allows a user to make a telephone call over the Internet or a dedicated network in IP packets, instead of over dedicated voice transmission lines.

With a VoIP service, it is possible for a user to move their VoIP phone to virtually any IP network and have the ability to make and receive calls at their home phone number, which is commonly referred to as a personal telephone number (TN). This is, in fact, one of the benefits of VoIP service, whereby for example a user can take their VoIP phone with them to a hotel with broadband Internet service and have their home phone ring in their hotel room. By contrast, traditional telephone service is tied to a specific location by nature of the circuit-based telephone network.

The problem with this new capability of VoIP, however, is that the traditional approach utilized by emergency services personnel to locate an individual in the event of an emergency 911 call no longer works reliably in VoIP systems. For example, a VoIP customer's location is recorded as their billing address and all calls originating from the customer's VoIP phone are assumed to be originating from the home address of the customer. If the customer takes the VoIP phone to a second location, such as a shore vacation home for the weekend, and a life-threatening medical emergency prompts the customer to dial 911, then the 911 call would be routed to the Public Safety Answering Point (PSAP) in the area of the customer's billing address, not their current address at the shore vacation residence.

Some VoIP service providers have attempted to solve this by routing 911 calls on their VoIP network to an intermediate dispatch center that determines which PSAP to route the call to. The intermediate dispatch center includes an operator for answering the emergency 911 call. The operator interrogates the caller to determine their location and then routes the call to the PSAP in the location of the caller. However, this approach can add extra time to the emergency response that can be critical to safety. Moreover, it is a labor intensive and relatively expensive for the service provider to maintain.

SUMMARY

Features described herein provide a method and system for determining a physical location of a device, such as a voice over packet (VoP) device, for communications, such as voice communications, that involve an access point.

In some embodiments, a profile, such as a user profile, may associate a plurality of physical locations with various access points. A voice over packet (VoP) device may connect to one of the access points to engage in voice communications via the access point, and the profile may be used to determine a physical location to be associated with the VoP device for purposes of the voice communications via the access point.

In some embodiments, the user may be prompted to confirm that the user is located at the determined physical location, and the user may also provide an updated physical location. In some embodiments, the updated physical location may comprise spoken address information, and speech-to-text conversion may be used. In some embodiments, an entered physical location may be denied in case of error.

In some embodiments, the physical locations may be street addresses. The access point may be identified by a network address, or by a nickname.

This Summary merely provides non-limiting examples of features that may be described and/or claimed herein. The Summary is not an exhaustive listing of all claim features, and should not serve to limit any of the claims of this patent.

DETAILED DESCRIPTION OF THE PREFERRED EMBODIMENT(S)

Figure 1:
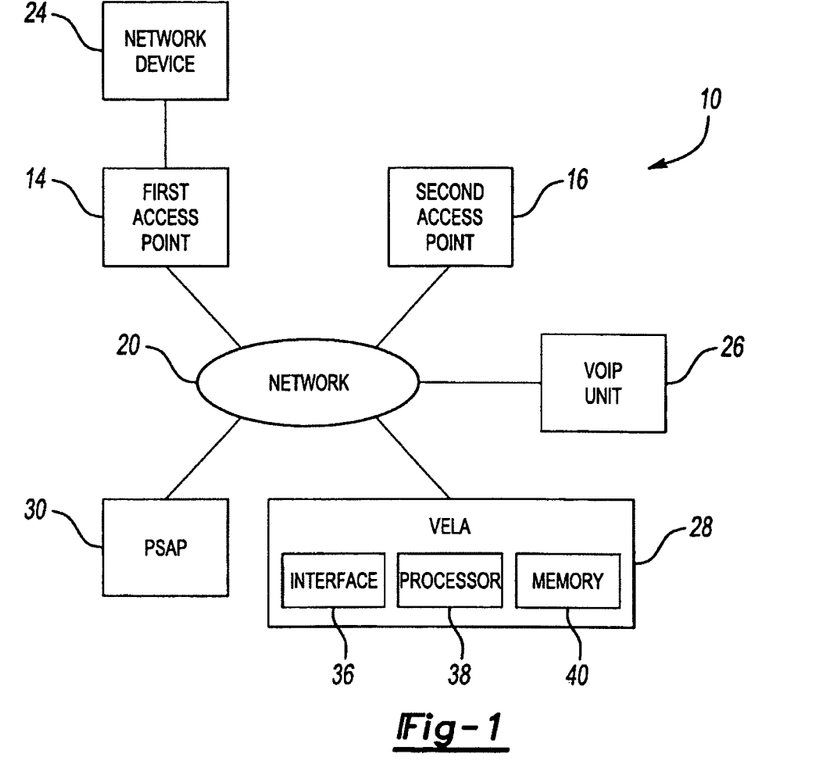
FIG. 1 illustrates a network system in accordance with one aspect of the present invention.

FIG. 1 illustrates a network system 10 in accordance with one aspect of the present invention. The network system 10 generally includes a first access point 14, a second access point 16, and a network 20 such that data and signals communicated over the network 20 are accessible by connected a network device 24 to one of the access points 14 and 16.

The network device 24 can be any type of computer or other item that is capable of network communications, such as computers, servers, personal digital assistants (PDAs), and the like. In particular, the present invention contemplates that the network device 24 is a Voice Over Internet Protocol (VoIP) device that is configured to make VoIP telephone calls over the network 20. In support thereof, the system 10 further includes a VoIP unit 26, a VoIP emergency location application (VELA) or processing unit 28, and a Public Safety Answering Point (PSAP) 30.

The VoIP device 24 can relate to any device that is capable of making VoIP calls. Such devices can include a number of features, including a telephone with an analog terminal adapter (ATA), a software-based Session Initiation Protocol (SIP) phone, a stand-alone or embedded Message Transfer Agent (MTA) device, a videophone (whether hardware-based or software-based), a wireless phone (generally cellular phones), a Personal Digital Assistant (PDA) with VoIP software, and the like. Preferably, the VoIP device 24 includes a unique personal telephone number that allows the device 24 to receive VoIP telephone calls anytime that it is connected to the network 20.

The first and second access points 14 and 16 are nodes or other features that are configured to connect the network device 24 to the network 20. The system 10 shown in FIG. 1 only indicates two access points 14 and 16, but it is contemplated that the system 10 may include any number of access points in any number of geographical areas. Preferably, a network address, such as an IP address, is associated with each access point to identify its location on the network 20.

The network 20 generally relates to any configuration that permits network communication and VoIP calls, such as through the exchange or transfer of electronic signals and packets over private IP networks, the Internet, or public switching telephone network (PSTN). It can include servers, databases, softswitches, and the like which function to enable, route, and/or control voice, video, and text-based communications and can include items generally described as VoIP softswitches, PacketCable Call Management Servers (CMS), VoIP call servers, IP Public Branch Exchanges (PBXs), SIP Proxy servers, SIP Registrar servers, SIP switches, and the like.

The PSAP 30 generally relates to a dispatch office that routes incoming 911 calls, or directly dispatches a public service department, such as a fire, police, or other emergency department. Preferably, the PSAP can receive calls over a PSTN and electronically over the Internet or other IP networks, or through other communications means, such as satellite or other wireless communication. In particular, the PSAP may be an enhanced 911 (E911) dispatch center that is capable of exchanging signals through IP-network-based applications, such as instant messaging clients, real-time communication tools (text, audio, and/or video-based), and other non-telephone clients.

The VELA 28 is configured in accordance with the present invention to communicate with the network 20 and to determine the location of a user on the network 20 based on a location of the network device 24, such as by determining whether the network device 24 is at the first access point 14 or the second access point 16. This can be advantageous for locating the user in the event of an emergency, such as when the user makes an emergency 911 call using a VoIP device from one of the access points 14 and 16.

The VELA 28 preferably includes an interface 36 that is configured for exchanging signals and packets with the network 20, such as for communicating with the VoIP device 24 and/or the PSAP 30 by exchanging signals and packets over the network to one or more of the access points 14 and 16. Preferably, the interface 36 includes an Interactive Voice Response (IVR) unit, Text to Speech (TTS), and/or a Speech to Text (STT) unit, which enables the interface 36 to convert speech received by the interface to electronic signals and to similarly output electronic signals to speech, such as to communicate with the user through the VoIP device 24. In particular, the interface 36 is able to output and receive voice and touch-tone signals to and from the VoIP device 24 so that the VELA 28 can communicate verbally with the user through a dialogue and record the responses of the user thereto.

The VELA 28 can be configured to route calls to the PSAP 30 via the PSTN using legacy methods of call networking/termination, to route calls via the public Internet or private Internet Protocol (IP) peering point, and to route calls to multiple interfaces of the PSAP 30, such as a primary interface preference and one or more secondary interfaces, based upon the PSAP's capabilities and preferences or the service provider's preferences. In addition, the VELA 28 can contact the secondary interface if the primary interface is not reachable for some reason, such as network congestion, network failure, etc.

The VELA 28 preferably includes a processor 38 and a memory 40 for controlling operation of the interface 36 and for executing other applications and strategies, which preferably includes a 911 call routing/query response application for transferring 911 calls from the access point to the PSAP associated with a location of the user, as described below in more detail. The VELA 28 can include other optional features, such as a web interface application configured to enable user location configuration, selection, and/or confirmation, and a video/graphic interface application configured to enable user location configuration, selection, and/or confirmation via a textual or graphical interface on a particular type of device (cellular phone screen, video phone screen, etc.).

The VELA 28 can optionally detect the type of network device 24 based upon information derived from its connection to the network 20. When one of these devices with graphical capabilities is used, the VELA 28 can be configured to, instead of initiating an out-dial, initiate a multimedia message to the user's device or present that device with a graphical interface. The user can respond to that message by pressing buttons on their device, clicking on the interface, or otherwise interacting with the graphical user interface or multimedia message. This interface may take several forms in the future but may be HTML-based, XML-based, or VoiceXML-based using today's technologies.

The VoIP unit 26 is a processing unit configured to permit and/or control VoIP communications. It can include any number of features, including memory and processors (not shown) that communicate with the network 20 for executing a VoIP application, such as a VoIP telephone call. In general, the system is configured to route calls to the VoIP device 24 based on the telephone number assigned to it so that a user can receive calls on the telephony device at any access point 14 and 16 on the network 20 that is in communication with the VoIP unit 26.

The system 10 shown in FIG. 1 is only provided for exemplary purposes and is not intended to limit the scope of the present invention. Rather, the present invention contemplates that the system 10 may include more or less features than those shown in FIG. 1. In particular, the VoIP device 24 and each of the access points 14 and 16 are illustrated as separate items, however, the present invention contemplates that an access point may be integrated into the VoIP device 24 and, in addition, that these two items may be further integrated into a fixed or portable communications and/or computing device.

Figure 2:
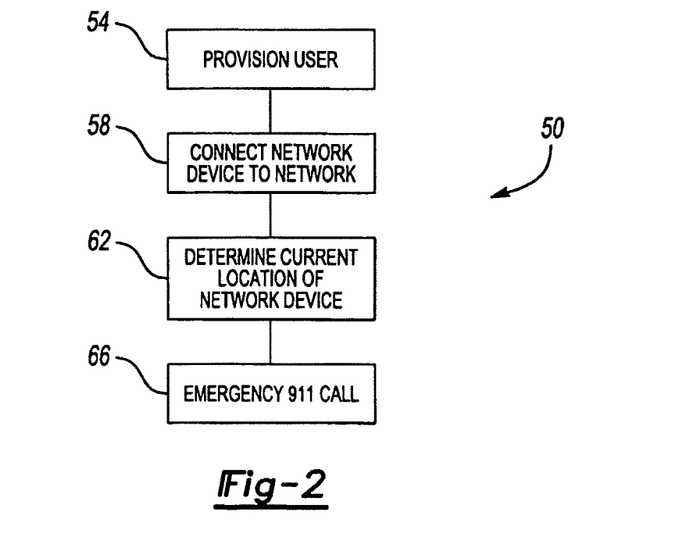
FIG. 2 illustrates a flowchart of a method for determining a location of a device connected to a network in accordance with one aspect of the present invention.

FIG. 2 illustrates a flowchart 50 of a method for locating the network device (VoIP device) when it is connected to a network. The method is advantageous in locating the user in the event of an emergency 911 call from the network device 24 and for routing the emergency 911 call to the PSAP 30 associated with the location of the user.

Block 54 relates to provisioning a user for operation with the VELA. The provisioning can include any number of features, and generally comprises creating and storing a user profile in the database of the VELA. The user profile can be created by an operator inputting the user's information into the VELA, by the user inputting the information themselves, such as through a graphical user interface (GUI) or web page, and/or automatically by querying the VoIP device when it is connected to the network, which is advantageous for determining the IP address and network hops associated with the access point to which the user connects the VoIP device, as it may be difficult for the user or operator to input this information. Optionally, block 54 can be skipped and the user profile can be created dynamically upon connecting the VoIP device to one of the access points.

The user profile preferably identifies the user with a telephone number and includes additional location information, such as a physical address (city, state, zip code, apartment number, etc.) and network address (IP address and network hops) for the access point from which the user intends to connect to the network for making VoIP telephone calls. The network address is associated with the physical address as the physical addresses are more unique than the network addresses. This is because the network addresses may not, by nature of them being shared across what may be a small or large area and one or many people, be at the same location as the user, or at least within a small enough area relative to the access point associated with the user that emergency personnel would be able to locate the user in an emergency. Network addresses may also be dynamically assigned, such that the same physical address will show up at different network addresses over time. The physical location indicates where the user is located when connecting to the access point associated with the current network address so that the user can be located in the event of an emergency 911 call.

Multiple entries can be made in the user profile if the user intends to use the VoIP device at multiple locations on the network. Preferably, a nickname or another unique identifier is provided if the user profile includes multiple residences or locations for the user so that each location can be easily distinguished. For example, the user may intend to use the VoIP device at home, at a beach vacation home, and at work. In which case, the user profile is provisioned with physical and network address for each of the locations.

Block 58 relates to connecting the VoIP device to the network, such as if the user intends to make a call or if the user is merely connecting the device to the network to receive calls, which may occur in the act of turning on or plugging in a device. Upon connecting to the network or in response to a message from the VELA, the VoIP device sends a message to the VELA that includes the telephone number assigned with the VoIP device. The VELA analyzes the message to determine the IP address of the access point to which the VoIP device is connected and to determine any network hops between the access point and the VELA, such as by tracerouting the IP address to determine the network hops. This information is then stored in the memory of the VELA for use in determining a location of the user. Depending upon the results of this transaction, the user may be queried by the VELA to confirm his/her correct physical location, select from a list of locations which may or may not be sorted based upon the VELA's best estimate of the location, or choose to configure a new location in the VELA.

Block 62 relates to determining a current location for the user based on the telephone number and network address determined in block 58. Initially, the VELA uses the telephone number to search the database for a user profile that includes the same telephone number, i.e. to match a user profile with the telephone number. Once the user profile is located, the VELA compares the network address determined in block 58 with the network addresses in the user profile. If one of the network addresses matches, the VELA pulls the associated physical address and controls the interface to contact the user, such as through an out-going call or other message to the user and/or their telephony device. The user is then asked whether the physical address corresponds with the current location of the user. If the user to determine their location. The location is denied, for example, if there is an error during the inputting of the physical location to the user profile, if the user intends to be at a different location but maintains the use of the same access point, and if the user failed to provide a physical address in the user profile. In response to the denial, the VELA interrogates the user further to determine the physical address that they desire to associate with the network address. This information is then stored in the user profile so that it is available the next time the user connects to the network and the current location of the user is noted.

If none of the network addresses in the user profile match the network address determined in block 58, then the user is in an unknown or new location. In which case, the VELA controls the interface to contact the user, such as through an out-going call or message, to create an entry for the unknown network ID. The entry is similar to those described above, in that the user is questioned by the VELA to determine a physical address and nickname for association with the unknown network address. Once the entry is complete, the physical address associated with the new entry is added to the user's profile and noted as the current location of the user.

The dialogue to determine the location of the user, as described above, can take any number of forms. For example, the VELA can be configured to provide the following sequential dialogue:

1. This is the 911 Service Application calling. We were unable to automatically determine your location. Please tell us where your phone is connected so that we can connect your call appropriately in case you have an emergency.
  a. Press 1 now if you are calling from "Home."
    i. 1 pressed, You are calling from "Home."
    ii. If this is incorrect, press # to go back to the main menu.
    iii. If this is correct, press 1 now or hangup.
    i. 1 pressed, You are calling from "Home."
    ii. If this is incorrect, press # to go back to the main menu.
    iii. If this is correct, press 1 now or hangup.
    iv. If the address of this location has changed, press 2 now to record the new address.
  b. Press 2 now if you are calling from "Beach House."
    i. 2 pressed, You are calling from "Beach House."
    ii. If this is incorrect, press # to go back to the main menu.
    iii. If this is correct, press 1 now or hangup.
    iv. If the address of this location has changed, press 2 now to record the new address. (Speech to Text engine invoked.)
  c. Press 3 now if you are calling from "Work."
    i. 3 pressed, You are calling from "Work."
    ii. If this is incorrect, press # to go back to the main menu.
    iii. If this is correct, press 1 now or hangup.
    iv. If the address of this location has changed, press 2 now to record the new address.
  d. Press 4 now if you are calling from a new location.
    i. We need a nickname for this location, such as "Home" or "Beach House." Please speak the nickname of your location now.
    ii. We need a house number for this location. Please speak the number now or use your keypad.
    iii. We need a street for this location. Please speak the street now.
    iv. We need a city for this location. Please speak the city now.
    v. We need a State for this location. Please speak the State now.

vi. We need a ZIP Code for this location. Please speak the ZIP Code now or use your keypad. (The ZIP Code could be used to avoid having to ask for the city and state, if desired.)

The VELA can also be configured with a location matching application (LMA) to facilitate locating the user. In general, the LMA is a process of matching network address determined upon connection of the VoIP device to the network addresses in the user profile when the network addresses fails to exactly match, such as if the user is at the same physical location but using a different access point or an access point the utilizes multiple network address. The VELA utilizes the LMA to predictively attempt to match the network address (location of the user) by executing the following logical operations:

1. Does the current network address detected match a network address in the user profile? If so, match the current network address to the corresponding network address in the user profile and dialogue with the user to determine that the physical address associated therewith corresponds with the current location of the user, if not, proceed to next step.

2. VELA performs a traceroute on the current network address and records every hop in the traceroute. Does the first hop of the traceroute match any of the hops (first or otherwise) for the other network addresses in the user profile. If so, match the current network address to the corresponding network address in the user profile and dialogue with the user to determine the physical address associated therewith corresponds with the current location of the user, if not, proceed to next step.

3. Does the second hop of the traceroute match any of the hops in the Location Database for the user. If so, match the current network address to the corresponding network address in the user profile and dialogue with the user to determine the physical address associated therewith corresponds with the current location of the user, if not, proceed to next step with the remainder of the hops recorded by the trace route.

As described above, the LMA utilizes intermediate network hops for the current network address of the user to locate the physical address of the user. This can be advantageous to narrow down a geographical area in which the user is located. For example, the physical address of the user can be approximated by the intermediate network hops if they match with any of the intermediate network hops in the user profile.

Block 66 relates to the user making an emergency 911 call. The emergency call is recognized by the VELA and routed to the appropriate PSAP based upon the location of the user determined in block 62. Each time the user connects their VoIP device to another access point, the process above is repeated to determine the location of the user. As such, anytime the user makes an emergency 911 call the VELA is able to locate the user and route the call to the appropriate PSAP. Preferably, the VELA includes logic or memory maps that facilitate locating the appropriate PSAP. For example, the VELA may include a database of PSAPs that are associated with either the physical address or the network address in the various user profiles.

When a user dials 911, the softswitch routes the call to the VELA, which routes the call to the appropriate PSAP (see PSAP Interface Technical Options below), based upon the user's current location. No call to an intermediate dispatch center is needed. Alternatively, the softswitch could perform a query to the VELA to obtain the current PSAP for the VoIP user's TN, passing this information back to the softswitch and enabling the softswitch to complete the call itself.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
   sending, for output via a voice over packet (VoP) device, an indication of a plurality of physical locations associated with the VoP device;
   receiving, from the VoP device, a selection of a physical location of the plurality of physical locations;
   storing information indicating the selected physical location; and
   sending, based on the selected physical location, an indication of a current physical location of the VoP device for a VoP communication involving the VoP device.

2. The method of claim 1, further comprising causing display of a list, of the plurality of physical locations, that is sorted based on an estimate of the current physical location of the VoP device.

3. The method of claim 1, wherein the indication of the plurality of physical locations is based on an estimate of the current physical location of the VoP device, and wherein the method comprises determining the estimate based on a network address associated with an access point that is connected to the VoP device.

4. The method of claim 1, further comprising:
   determining, based on the selected physical location and for a VoP call initiated by the VoP device, the current physical location of the VoP device.

5. The method of claim 1, further comprising:
   storing information indicating a physical location of each of a plurality of access points that are associated with the VoP device for VoP calling.

6. The method of claim 1, further comprising storing, in a profile associated with the VoP device, information indicating the plurality of physical locations.

7. The method of claim 1, wherein the VoP device is a wireless device.

8. The method of claim 1, wherein the VoP device is a Session Initiation Protocol (SIP)-capable device.

9. The method of claim 1, further comprising determining, prior to the sending the indication of the plurality of physical locations associated with the VoP device, that the VoP device has connected to an access point for VoP communication.

10. An apparatus comprising:
    one or more processors; and
    memory storing instructions that, when executed by the one or more processors, cause the apparatus to:
       send, for output via a voice over packet (VoP) device, an indication of a plurality of physical locations associated with the VoP device;
       receive, from the VoP device, a selection of a physical location of the plurality of physical locations;
       store information indicating the selected physical location; and
       send, based on the selected physical location, an indication of a current physical location of the VoP device for a VoP communication involving the VoP device.

11. The apparatus of claim 10, wherein the instructions, when executed by the one or more processors, cause the apparatus to cause display of a list, of the plurality of physical locations, that is sorted based on an estimate of the current physical location of the VoP device.

12. The apparatus of claim 10, wherein the indication of the plurality of physical locations is based on an estimate of the current physical location of the VoP device, and wherein the instructions, when executed by the one or more processors, cause the apparatus to determine the estimate based on a network address associated with an access point that is connected to the VoP device.

13. The apparatus of claim 10, wherein the instructions, when executed by the one or more processors, cause the apparatus to determine, based on the selected physical location and for a VoP call initiated by the VoP device, the current physical location of the VoP device.

14. The apparatus of claim 10, wherein the instructions, when executed by the one or more processors, cause the apparatus to store information indicating a physical location of each of a plurality of access points that are associated with the VoP device for VoP calling.

15. The apparatus of claim 10, wherein the instructions, when executed by the one or more processors, cause the apparatus to store, in a profile associated with the VoP device, information indicating the plurality of physical locations.

16. The apparatus of claim 10, wherein the VoP device is a wireless device.

17. The apparatus of claim 10, wherein the VoP device is a Session Initiation Protocol (SIP)-capable device.

18. The apparatus of claim 10, wherein the instructions, when executed by the one or more processors, cause the apparatus to determine, prior to the sending the indication of the plurality of physical locations associated with the VoP device, that the VoP device has connected to an access point for VoP communication.

19. A system comprising:
a computing device and an access point,
wherein the computing device comprises:
one or more processors; and
memory storing instructions that, when executed by the one or more processors, cause the computing device to:
send, for output via a voice over packet (VoP) device, an indication of a plurality of physical locations associated with the VoP device;
receive, from the VoP device, a selection of a physical location of the plurality of physical locations;
store information indicating the selected physical location; and
send, based on the selected physical location, an indication of a current physical location of the VoP device for a VoP communication involving the VoP device, and
wherein the access point is configured to conduct the VoP communication involving the VoP device.

20. The system of claim 19, wherein the instructions, when executed by the one or more processors, cause the computing device to cause display of a list, of the plurality of physical locations, that is sorted based on an estimate of the current physical location of the VoP device.

21. The system of claim 19, wherein the indication of the plurality of physical locations is based on an estimate of the current physical location of the VoP device, and wherein the instructions, when executed by the one or more processors, cause the computing device to determine the estimate based on a network address associated with the access point.

22. The system of claim 19, wherein the instructions, when executed by the one or more processors, cause the computing device to determine, based on the selected physical location and for a VoP call initiated by the VoP device, the current physical location of the VoP device.

23. The system of claim 19, wherein the instructions, when executed by the one or more processors, cause the computing device to store information indicating a physical location of each of a plurality of access points that are associated with the VoP device for VoP calling.

24. The system of claim 19, wherein the instructions, when executed by the one or more processors, cause the computing device to store, in a profile associated with the VoP device, information indicating the plurality of physical locations.

25. The system of claim 19, wherein the VoP device is a wireless device.

26. The system of claim 19, wherein the VoP device is a Session Initiation Protocol (SIP)-capable device.

27. The system of claim 19, wherein the instructions, when executed by the one or more processors, cause the computing device to determine, prior to the sending the indication of the plurality of physical locations associated with the VoP device, that the VoP device has connected to the access point for VoP communication.

28. One or more non-transitory computer-readable media storing instructions that, when executed, cause:
sending, for output via a voice over packet (VoP) device, an indication of a plurality of physical locations associated with the VoP device;
receiving, from the VoP device, a selection of a physical location of the plurality of physical locations;
storing information indicating the selected physical location; and
sending, based on the selected physical location, an indication of a current physical location of the VoP device for a VoP communication involving the VoP device.

29. The one or more non-transitory computer-readable media of claim 28, wherein the instructions, when executed, cause display of a list, of the plurality of physical locations, that is sorted based on an estimate of the current physical location of the VoP device.

30. The one or more non-transitory computer-readable media of claim 28, wherein the indication of the plurality of physical locations is based on an estimate of the current physical location of the VoP device, and wherein the instructions, when executed, cause determining of the estimate based on a network address associated with an access point that is connected to the VoP device.

31. The one or more non-transitory computer-readable media of claim 28, wherein the instructions, when executed, cause determining, based on the selected physical location and for a VoP call initiated by the VoP device, the current physical location of the VoP device.

32. The one or more non-transitory computer-readable media of claim 28, wherein the instructions, when executed, cause storing of information indicating a physical location of each of a plurality of access points that are associated with the VoP device for VoP calling.

33. The one or more non-transitory computer-readable media of claim 28, wherein the instructions, when executed, cause storing, in a profile associated with the VoP device, of information indicating the plurality of physical locations.

34. The one or more non-transitory computer-readable media of claim 28, wherein the VoP device is a wireless device.

35. The one or more non-transitory computer-readable media of claim 28, wherein the VoP device is a Session Initiation Protocol (SIP)-capable device.

36. The one or more non-transitory computer-readable media of claim 28, wherein the instructions, when executed, cause determining, prior to the sending the indication of the plurality of physical locations associated with the VoP device, that the VoP device has connected to an access point for VoP communication.

* * * * *

UNITED STATES PATENT AND TRADEMARK OFFICE
CERTIFICATE OF CORRECTION

PATENT NO. : 10,517,140 B2
APPLICATION NO. : 16/052201
DATED : December 24, 2019
INVENTOR(S) : Jason D. Livingood It is certified that error appears in the above-identified patent and that said Letters Patent is hereby corrected as shown below:

In the Specification

Column 6, Detailed Description of Preferred Embodiment(s), Lines 39-41:
After "hangup." please delete "i. 1 pressed, You are calling from "Home." ii. If this is incorrect, press # to go back to the main menu. iii. If this is correct, press 1 now or hangup."

Signed and Sealed this
Twenty-fourth Day of May, 2022

Katherine Kelly Vidal
*Director of the United States Patent and Trademark Office*